(12) United States Patent
Bahl et al.

(10) Patent No.: US 11,635,995 B2
(45) Date of Patent: Apr. 25, 2023

(54) SYSTEMS AND METHODS FOR ORCHESTRATING MICROSERVICE CONTAINERS INTERCONNECTED VIA A SERVICE MESH IN A MULTI-CLOUD ENVIRONMENT BASED ON A REINFORCEMENT LEARNING POLICY

(71) Applicant: Cisco Technology, Inc., San Jose, CA (US)

(72) Inventors: Rohit Bahl, Kanata (CA); Paul Clyde Sherrill, Mountain View, CA (US); Stephen Joseph Williams, Stittsville (CA)

(73) Assignee: Cisco Technology, Inc., San Jose, CA (US)

(*) Notice: Subject to any disclaimer, the term of this patent is extended or adjusted under 35 U.S.C. 154(b) by 636 days.

(21) Appl. No.: 16/513,510

(22) Filed: Jul. 16, 2019

(65) Prior Publication Data
US 2021/0019194 A1    Jan. 21, 2021

(51) Int. Cl.
*G06F 9/50* (2006.01)
*G06F 9/38* (2018.01)
(Continued)

(52) U.S. Cl.
CPC .......... *G06F 9/5072* (2013.01); *G06F 9/3877* (2013.01); *G06N 20/00* (2019.01); *G06F 9/45558* (2013.01)

(58) Field of Classification Search
None
See application file for complete search history.

(56) References Cited

U.S. PATENT DOCUMENTS 9,015,324 B2    4/2015 Jackson
10,027,768 B2   7/2018 Rao
(Continued)

FOREIGN PATENT DOCUMENTS

WO    2019025944    2/2019

OTHER PUBLICATIONS

Papapanagiotou et al., "NDBENCH: Benchmarking Microservices at Scale," arxiv.org, Jul. 27, 2018, pp. 1-10.

*Primary Examiner* — Meng Ai T An
*Assistant Examiner* — Zujia Xu
(74) *Attorney, Agent, or Firm* — Polsinelli

(57) ABSTRACT

A multi-cloud service mesh orchestration platform can receive a request to deploy an application as a service mesh application. The platform can tag the application with governance information (e.g., TCO, SLA, provisioning, deployment, and operational criteria). The platform can partition the application into its constituent components, and tag each component with individual governance information. For first time steps, the platform can select and perform a first set of actions for deploying each component to obtain individual rewards, state transitions, and expected returns. The platform can determine a reinforcement learning policy for each component that maximizes a total reward for the application based on the individual rewards, state transitions, and expected returns of each first set of actions selected and performed for each component. For second time steps, the platform can select and perform a second set of actions for each component based on the reinforcement learning policy for the component.

18 Claims, 8 Drawing Sheets

(51) Int. Cl.
*G06N 20/00* (2019.01)
*G06F 9/455* (2018.01)

(56) References Cited

U.S. PATENT DOCUMENTS

| | | | |
|---|---|---|---|
| 10,057,139 B2 | 8/2018 | Dong et al. | |
| 11,134,013 B1* | 9/2021 | Allen | G06F 9/5072 |
| 11,457,080 B1* | 9/2022 | Meduri | H04L 67/60 |
| 2015/0215173 A1* | 7/2015 | Dutta | G06F 9/5038 |
| | | | 709/226 |
| 2016/0087885 A1* | 3/2016 | Tripathi | H04W 76/12 |
| | | | 370/389 |
| 2016/0219101 A1* | 7/2016 | Forsman | H04L 69/321 |
| 2017/0031955 A1* | 2/2017 | Kenchammana-Hosekote | |
| | | | H04L 67/142 |
| 2018/0019948 A1* | 1/2018 | Patwardhan | H04L 47/2475 |
| 2019/0245757 A1* | 8/2019 | Meyer | G06F 9/5072 |
| 2019/0356693 A1* | 11/2019 | Cahana | H04L 63/0869 |
| 2020/0125545 A1* | 4/2020 | Idicula | G06F 16/217 |
| 2020/0249998 A1* | 8/2020 | Che | G06N 3/063 |
| 2020/0404076 A1* | 12/2020 | Mahadevan | H04L 41/0836 |
| 2021/0255251 A1* | 8/2021 | Ukumori | G01R 31/392 |

* cited by examiner

SYSTEMS AND METHODS FOR ORCHESTRATING MICROSERVICE CONTAINERS INTERCONNECTED VIA A SERVICE MESH IN A MULTI-CLOUD ENVIRONMENT BASED ON A REINFORCEMENT LEARNING POLICY

TECHNICAL FIELD

The subject matter of this disclosure relates in general to the field of computer networking, and more particularly, to systems and methods for orchestrating microservice containers interconnected via a service mesh in a multi-cloud environment.

BACKGROUND

Enterprises and other entities have increasing demands for compute (e.g., Central Processing Unit (CPU), Graphics Processing Unit (GPU), Network Processing Unit, Neural Processing Unit, memory, storage, network bandwidth, operating systems, databases, software, applications, development environments, and other computing resources, to develop and run the applications that drive their businesses. To satisfy these ever-growing needs, these entities can reserve virtual computing resources from Cloud Service Providers (CSPs) and scale up and scale down as needed without having to purchase and physically manage the resources. These entities can select where to deploy their applications based on proximity, capabilities, performance, security, reliability, cost, and so forth. Unfortunately, while the number of CSPs continues to grow, the lack of uniformity among CSPs creates significant challenges for these entities that may want to deploy their applications across several different networks or clouds. Often, these entities are locked into a single CSP because it can be cost-prohibitive in terms of application performance, network latency, availability, reliability, security, computing resource utilization, power consumption, pricing, and other factors, to deploy a single enterprise application across multiple clouds. In many cases, organizations that purport to have adopted a multi-cloud architecture do not design applications that are truly multi-cloud. Instead, organizations may deploy separate applications across multiple clouds or deploy components of a single application across different clouds but limit deployment of each component to the same cloud. That is, each component remains fixed within one cloud and cannot migrate to a different cloud without extensive effort by human administrators. Thus, conventional applications often cannot take full advantage of true multi-cloud computing.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
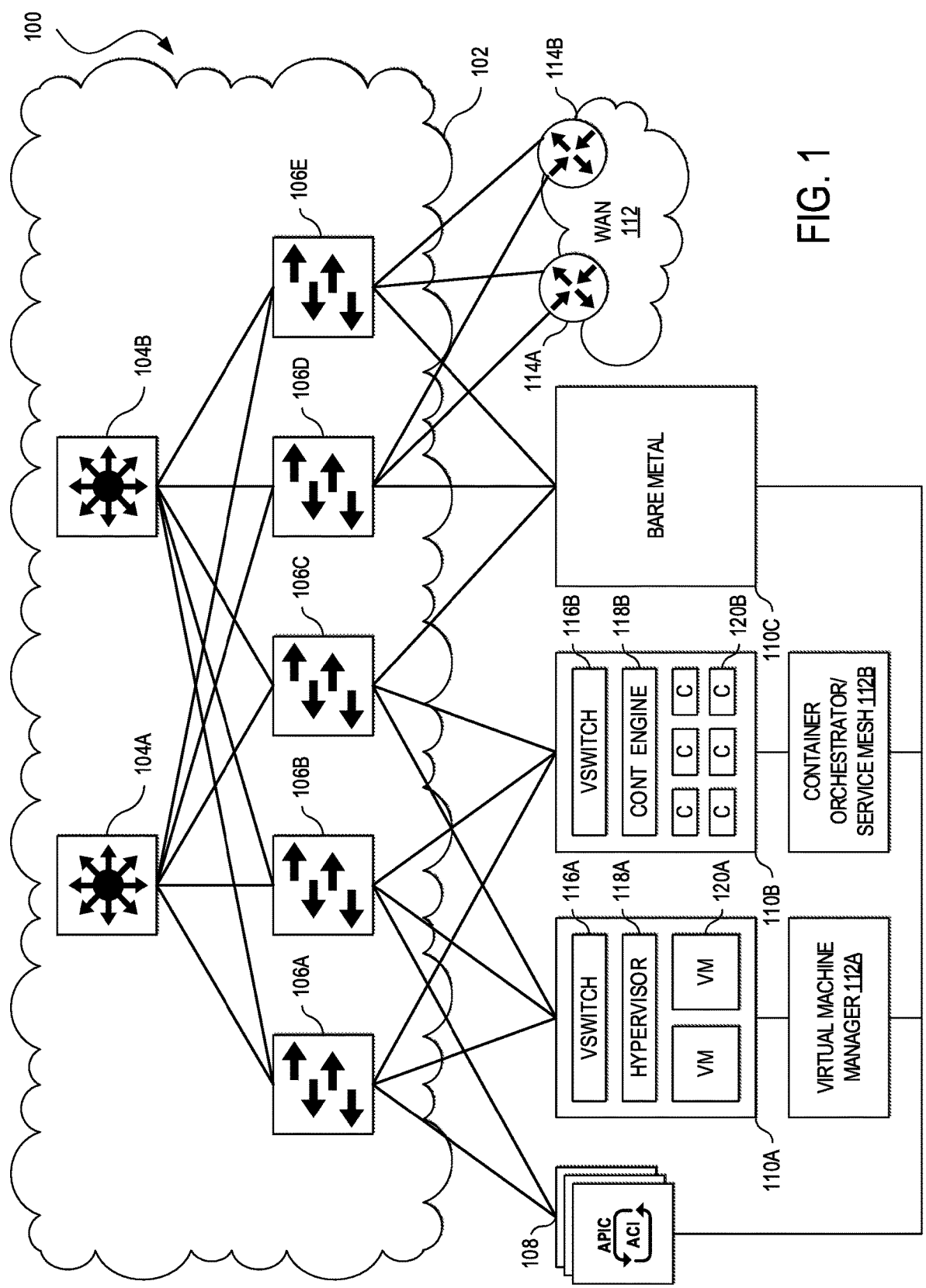
FIG. 1 illustrates a block diagram of an example of a data center network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for orchestrating microservice containers interconnected via a service mesh in a multi-cloud environment. A multi-cloud service mesh orchestration platform can receive a request to deploy an application as a service mesh application. The multi-cloud service mesh orchestration platform can tag or associate the service mesh application with governance information (e.g., Total Cost of Ownership (TCO) constraints, Service Level Agreement (SLA) requirements, and other criteria governing how to provision computing resources from multiple Cloud Service Provider (CSP) networks for deploying and operating the service mesh application). The multi-cloud service mesh orchestration platform can partition the service mesh application into its constituent components (e.g., layers, services, microservices), and tag each component with individual component-level governance information determined based on the over-arching governance information for the service mesh application. For example, the multi-cloud service mesh orchestration platform can partition the application into multiple microservice containers and tag each microservice container with individual microservice-level governance information derived from the governance information for the service mesh application. For each time step within a first time period, the multi-cloud service mesh orchestration platform can select and perform a first set of actions from multiple sets of actions for deploying each microservice container of the service mesh application to obtain one or more individual rewards, state transitions, and expected returns. The multiple sets of action can include deploying a microservice container using a reserved compute instance and deploying a microservice container using an unreserved compute instance. The multi-cloud service mesh orchestration platform can determine a reinforcement learning policy for each microservice container that maximizes a total reward for the service mesh application based on the one or more individual rewards, state transitions, and expected returns of each first set of actions selected and performed for each microservice container for each time within the first time period. For each time step within a second time period, the multi-cloud service mesh orchestration platform can select and perform a second set of actions for each microservice container of the application based on the reinforcement learning policy for the microservice container.

Example Embodiments

Although some enterprise applications can be deployed across multiple Cloud Service Provider (CSP) networks, these applications are typically manually configured and administered with limited to no flexibility to migrate between multiple CSP networks. For example, a conventional application can include a first component deployed in a first CSP network that may only scale up or scale down using first computing resources provisioned from the first CSP network as needed by the first component and a second component deployed in a second CSP network that may only scale up or scale down using second computing resources provisioned from the second CSP network as needed by the second component. Thus, each component may be unaware of the "big picture," including end-to-end performance, availability, reliability, security, computing resource utilization, power consumption, pricing, and other metrics. In addition, while a Service Level Agreement (SLA), Total Cost of Ownership (TCO) guidelines, and other governance information may be in place for the application as a whole, each component of the application (e.g., layers, services, microservices, etc.) may have no knowledge of its individual requirements and may be unable to take advantage of the differences in services, performance, security, reliability, and costs offered by different CSPs.

Various embodiments of the present disclosure may overcome the above and other deficiencies of the prior art by providing a multi-cloud service mesh orchestration platform that can deploy a service mesh application using compute instances provisioned from multiple CSP networks. The platform can achieve temporal location of one or more components of the service mesh application currently executing within certain types of compute instances (e.g., reserved instances) of a CSP network to spot instances, pre-emptible instances, low priority instances, or other unreserved instances in the same CSP network (e.g., in a different region or the same region with unreserved instances instead of reserved instances), in a different CSP network, and/or across multiple CSP networks.

Another aspect of the platform is the capability of tagging a service mesh application with its governance information (e.g., TCO constraints, SLA requirements, or other criteria governing provisioning, deployment, and operation of the application). The platform can partition the application into its constituent components (e.g., layers, services, microservices, containers, etc.) and tag each component with individual component-level governance information derived from the governance information of the service mesh application. For example, the platform can receive governance information including directives to minimize TCO but to operate the application at certain performance levels specified by an SLA. The platform can translate the TCO and SLA criteria to an individual cost constraint and individual SLA requirements for each constituent component of the application (e.g., microservice container), tag each microservice container with its individual cost constraint and SLA requirements, and enforce the individual cost constraint and SLA requirements to ensure the application operates, in the aggregate, according to the application's TCO constraint and SLA requirements.

Using reinforcement learning, the platform can determine the set of actions that maximizes a total reward (or minimizes a total cost) for deployment of an application according to the criteria for governing the application. For example, the platform can relocate the microservice containers of the application across multiple clouds despite an increase to a specific type of cost (e.g., application latency, network latency, network bandwidth utilization, network bandwidth cost, etc.) if a reinforcement learning policy determines that this set of actions best achieves user-defined criteria for governing the application so as to minimize TCO while complying with predetermined SLA requirements.

As another example, the platform can expand an application's capacity upon detecting an increased load on the application yet maintain TCO neutrality by provisioning unreserved compute instances and migrating existing microservice containers and deploying additional microservice containers to the unreserved compute instances if a reinforcement learning policy determines that this set of actions most closely adheres to user-defined criteria for governing the application so as to maximize application capacity while keeping TCO within a specified budget. As yet another example, the platform can adapt load balancing to prioritize certain microservices having lower throughput relative to other microservices. This can negatively affect network performance but can be the set of actions taken if a reinforcement learning policy determines that this set of actions best satisfies user-defined criteria for governing the application so as to maximize application performance while remaining within predetermined levels of load distribution across multiple CSP networks.

The above and other advantages can be achieved through the multi-cloud service mesh orchestration platform and equivalent systems and methods discussed herein. In some embodiments, the platform can receive a request to deploy an application as a service mesh application. The platform can instantiate the service mesh application, and tag the service mesh application with governance information including criteria governing how to provision computing resources from multiple CSP networks for deploying and operating the service mesh application.

The platform can partition the service mesh application into its constituent components, such as the application's layers, services, microservices, and so forth, and tag each component with individual component-level governance information derived from the governance information for the service mesh application.

The platform can include a reinforcement learning system. Reinforcement learning is a type of machine learning that uses a trial and error approach to progress toward a user-defined objective. A reinforcement learning system can achieve its objective through a learning agent capable of sensing a state of its environment and selecting an action to perform that can change the environment in some way. Upon performing the action, the system can communicate to the learning agent the change to the environment (e.g., a transition from one state of the environment to another state of the environment) due to the action, and an indicator of whether the state transition and/or action was correct or incorrect (e.g., a reward). The behavior of the learning agent or the mapping of state to action is referred to as a policy, and it is generally the objective of the reinforcement learning system to determine an optimal policy or the actions to take to maximize a total reward (or minimize a total cost) over a time period (e.g., from an initial state to an end state).

Various approaches can be used to learn or approximate the optimal policy, and a common approach can involve determining or approximating optimal value functions, including the optimal state-value function (e.g., a function that assigns to each state the largest expected return or total amount of reward accumulated over the future, starting from that state) and the optimal action-value function or optimal Q-value function (e.g., a function that assigns to each state-action pair the largest expected return, or total amount of reward accumulated over the future, for a given state and a given action). An optimal policy can be derived using a greedy policy that selects actions having the highest Q-value for each state. An example algorithm for determining the optimal Q-value function is Q-learning, which can involve iteratively updating Q-values for each state-action pair (e.g., taking an action, receiving a reward and state transition, updating Q-values with the reward and largest expected return, and repeating until transitioning to an end state) for each time step over a time period until convergence with the optimal Q-value function.

For each time step within a first time period, the multi-cloud service mesh orchestration platform can select and perform a first set of actions from multiple sets of actions for deploying each microservice container of the service mesh application to obtain one or more individual rewards, state transitions, and expected returns. As one of ordinary skill in the art will understand, a reward can be equivalent to a cost or a penalty; it is a mere design choice to define rewards that increase in scale and to maximize a total reward accumulated from increasing rewards or to define costs that decrease in scale and to minimize a total cost accumulated from decreasing costs. Thus, a reward (and the objective of maximizing a cumulative reward), and a cost (and the objective of minimizing a cumulative cost) may be interchangeable.

The multiple sets of actions can include deploying one or more microservice containers using one or more reserved compute instances or deploying the one or more microservice containers using one or more unreserved compute instances (e.g., spot instances, pre-emptible instances, low priority instances, etc.) within a current CSP network (e.g., in a different region or within other types of compute instances), a different CSP network, and/or multiple CSP networks (e.g., a first microservice container in one CSP network and a second microservice container in another CSP network, a first instance of a microservice container in one CSP network or a second instance (i.e., a replica) of the microservice container in another CSP network, etc.). The first set of actions can include terminating or hibernating the reserved compute instances when the first set of actions includes deploying the microservice containers using the unreserved compute instances.

The multi-cloud service mesh orchestration platform can determine a reinforcement learning policy for each microservice container that maximizes a total reward for the service mesh application based on the one or more individual rewards, state transitions, and expected returns of each first set of actions selected performed for each microservice container for each time step within the first time period. The reinforcement learning policy can represent an optimal policy or a policy that maximizes a total reward over the long run, and can be derived from Q-learning as discussed throughout the present disclosure.

For each time step of a second time period, the multi-cloud service mesh orchestration platform can select and perform a second set of actions for each microservice container based on the reinforcement learning policy for the microservice container. In some embodiments, the multi-cloud service mesh orchestration platform can continuously re-learn the optimal deployment for the service mesh application to dynamically adapt to different network conditions, loads, TCOs, and other characteristics of the application. The multi-cloud service mesh orchestration platform can obtain one or more second individual rewards, state transitions, and expected returns of each second set of actions selected and performed for each microservice container for each time step within the second time period. The multi-cloud service mesh orchestration platform can determine an updated reinforcement learning policy that maximizes the total reward for the service mesh application based on the one or more second individual rewards, state transitions, and expected returns of each second set of actions selected and performed for each microservice container for each time step within the second time period. For each time step within a third time period, the platform can select and perform a third set of actions for each microservice container of the service mesh application based on the updated reinforcement learning policy for the microservice container. Numerous other functions and advantages are described and suggested below as may be provided in accordance with the various embodiments.

FIG. 1 illustrates a block diagram of an example of a data center data center network 100 which can be implemented by one or more networks or clouds, including private clouds (e.g., an enterprise network, a colocation provider network, etc.) and/or public clouds (e.g., an Infrastructure as a Service (IaaS) network, a Platform as a Service (PaaS) network, a Software as a Service (SaaS) network, or other Cloud Service Provider (CSP) network), in a multi-cloud environment. An example of an implementation of the data center network 100 is Cisco® Application Centric Infrastructure (Cisco ACI®). However, one of ordinary skill in the art will understand that, for the data center network 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The data center network 100 can include a network fabric 102 comprising spine switches 104A and 104B (collectively, 104) and leaf switches 106A, 106B, 106C, 106D, and 106E (collectively, 106). The leaf switches 106 can connect to the spine switches 104 in a full-mesh topology or spine-and-leaf topology. The spine switches 104 can operate as the backbone of the data center network 100 and interconnect the leaf switches 106. For example, every leaf switch 106 can connect to every spine switch 104 in the network fabric 102, and the paths within the network fabric 102 may be randomly chosen so that the traffic load can be evenly distributed among the spine switches 104. In this manner, network performance may only slightly degrade if one of the spine switches 104 fails. If oversubscription of a link occurs (e.g., if more traffic is generated than can be aggregated on an active link at one time), network capacity can be scaled up by adding an additional spine switch 104 and extending uplinks to every leaf switch 106. This can add inter-layer bandwidth and reduce oversubscription. If access port capacity becomes an issue, a new leaf switch can be added by connecting it to every spine switch 104 and adding the network configuration to the new leaf switch. If no oversubscription occurs between the leaf switches 106 and their uplinks, then a non-blocking architecture can be achieved.

The leaf switches 106 can include fabric ports and access ports (non-fabric ports). The fabric ports can provide the uplinks to the spine switches 104, while the access ports can provide connectivity to physical servers (e.g., rack-mount servers, blade servers, or other computing devices) and virtual servers (e.g., virtual machines, containers, or other virtual partitions). In this example, the leaf switches 106 can interconnect physical servers 110A, 110B, and 110C (collectively, 110) and virtual machines 120A, containers 120B, and other virtual servers (collectively, 120). Some examples of physical servers include Cisco® Unified Computing System (Cisco UCS®) B-Series Blade Servers, Cisco UCS® C-Series Rack Servers, Cisco UCS® S-Series Storage Servers, Cisco UCS® E-Series Blade Servers, and Cisco HyperFlex™ HX-Series nodes, among others.

In some embodiments, one or more of the physical servers 110, such as the physical server 110A, may each have instantiated thereon a hypervisor 118A for creating and running one or more virtual machines 120A. In some embodiments, the virtual machines 120A may host one or more containers. Alternatively or in addition, one or more of the physical servers 110, such as the physical server 110B, may run a container engine 118B for hosting one or more containers 120B. Alternatively or in addition, one or more of the physical servers 110 can run other software and include other components for supporting other types of virtual servers. Networks in accordance with various embodiments may include any number of physical servers hosting any number of virtual machines, containers, or other virtual servers. In some embodiments, one or more of the physical servers 110, such as the physical server 110C, may also operate as a bare metal server (i.e., a physical server that does not host virtual machines, containers, or other virtual servers).

The leaf switches 106 can also provide connectivity to various types of network devices, including network fabric interconnects (e.g., Cisco UCS® 6200 Series fabric interconnects, 6300 Series fabric interconnects, 6454 fabric interconnects, etc.); switches (e.g., Cisco® Catalyst switches, Cisco Nexus® switches, Cisco® Industrial Ethernet switches, Cisco Meraki® MS switches, etc.); routers (e.g., Cisco® Integrated Services Routers (ISRs), Cisco® Aggregation Services Routers (ASRs), Cisco® Network Convergence Systems (NCS) routers, Cisco Meraki® MX systems, etc.); access points (e.g., Cisco Aironet® access points, Cisco Meraki® MR access points, Cisco® Small Business access points, etc.); wireless network controllers (e.g., Cisco Catalyst® wireless LAN controllers (WLCs), Cisco® 8540 WLCs, Cisco® 5520 WLCs, Cisco® 3144 WLCs, etc.); and network management appliances (e.g., Cisco® Application Policy Infrastructure Controller (APIC™) appliances, Cisco® Digital Network Architecture (DNA™) Center appliances, Cisco® Software DefinedWide Area Network (SD-WAN) vManage and vSmart appliances, Cisco Prime® appliances, etc.). In this example, the leaf switches 106 are shown interconnecting network fabric controller 108, edge network devices 114A and 114B (e.g., switches, routers, gateways, etc.) (collectively, 114), and virtual switches 116A and 116B (collectively, 116) to the network fabric 102.

The network fabric controller 108 can operate as a centralized point of configuration and management for the network fabric 102. In some embodiments, the network fabric controller 108 may be implemented using Cisco APIC™. Cisco APIC™ can provide a centralized point of automation and management, policy programming, application deployment, and health monitoring for the network fabric 102. In this example, the APIC™ can be embodied as a replicated, synchronized, and clustered set of network fabric controller appliances. In other embodiments, other configurations or network management platforms can be utilized for administering the network fabric 102, such as Cisco DNA™ Center, Cisco® SD-WAN, and Cisco Prime®, among others.

The network fabric controller 108 may operate in combination with one or more virtual machine managers 112A (e.g., VMware vSphere®, Microsoft® System Center Virtual Machine Manager, etc.), container orchestrators (e.g., Linux Foundation Kubernetes®, Docker Swarm®, Apache Mesos®, Mesosphere® Marathon, etc.)/service meshes 112B (e.g., Linux Foundation Envoy™, Istio®, Linux Foundation Linkerd®, Hashicorp Consul®, etc.), or other virtualization managers (collectively, 112) for deploying the virtual machines 120A, containers 120B, or other virtual servers. The virtual machine manager 112A can be used to administer a virtual switch 116A (e.g., Cisco® Application Virtual Switch (AVS), Cisco ACI™ Virtual Edge, Cisco Nexus® 1000VE, Cisco Nexus® 1000V, Open Virtual Switch (OVS), etc.), hypervisor 118A, and one or more virtual machines 120A instantiated on a single physical server 110A; a distributed virtual switch or multiple virtual switches, multiple hypervisors, and multiple virtual machines spanning multiple physical servers; or other virtual machine computing environments. Similarly, the container orchestration/service mesh 112B can be used to administer a virtual switch 116B (e.g., OVS, OVS with Intel® Data Plane Development Kit (DPDK), OVS with Contiv plugin, etc.), container engine 118B (e.g., Docker®, CoreOS® rkt, Linux® Containers (LXC), etc.), and one or more containers 120B instantiated on a single physical server 110B; a distributed virtual switch or multiple virtual switches, multiple container engines, multiple container orchestrators, multiple service meshes, and multiple containers spanning multiple physical servers or virtual machines; and other containerized computing environments.

In addition to the network fabric controller 108, the leaf switches 106 can also connect the network fabric 102 to other network appliances and services, such as a firewall or other network security appliance or service (e.g., Cisco® Advanced Malware Protection (AMP) appliance, Cisco® Industrial Security Appliance (ISA), Cisco® Adaptive Security Appliance (ASA), Cisco® Identity Services Engine (ISE) appliance, Cisco Firepower® appliance, Cisco® Content Security Management appliance, Cisco® Security Packet Analyzer, etc.); network analytics appliance (e.g., Cisco Tetration® appliances); application accelerator; Network Address Translation (NAT) device; load balancer; Distributed Denial of Service (DDoS) mitigator; Deep Packet Inspection (DPI) device; Intrusion Prevention System (IPS); Intrusion Detection System (IDS); Internet Protocol Security (IPSec) system; Session Border Controller (SBC); traffic monitor; Evolved Packet Core (EPC) device; WAN optimizer; and so forth. These network appliances and services can be implemented in hardware as physical network appliances and/or in software using general-purpose Central Processing Units (CPUs), Graphics Processing Units (GPUs), Network Processing Units (NPUs), Network Interface Controllers (NICs), smart NICs, and so forth (e.g., virtualized network appliances and services executing within virtual machines (e.g., Virtual Network Functions (VNFs)), containers (e.g., Cloud-Native Functions (CNFs)), or other virtual servers). In some embodiments, the network fabric controller 108 can provide automatic service insertion based on policies defined by an administrator of the data center network 100. The network fabric controller 108 can use service graphs (e.g., ordered sets of service function nodes between a set of endpoints and a set of network appliances or service specified for an application) to push the needed configuration and security policies to the data center network 100.

In some embodiments, the leaf switches 106 can also connect endpoint groups (EPGs) to the network fabric 102 and other networks (e.g., WAN transport network 112). EPGs can be groupings of applications, or application components, and tiers for implementing forwarding and policy logic. EPGs can allow for separation of network policy, security, and forwarding from addressing by using logical application boundaries. EPGs can be used in the data center network 100 for mapping applications in the network. For example, EPGs can comprise a grouping of endpoints in the data center network 100 indicating connectivity and policy for applications.

In this example, the leaf switches 106D and 106E can operate as border leaf switches in communication with the edge network devices 114A and 114B (e.g., switches, routers, gateways, etc.) for providing connectivity to the WAN transport network 112. WANs can connect geographically dispersed nodes over long-distance communications links or networks, such as over the Internet (e.g., Digital Subscriber Line (DSL), cable, etc.), Multi-Protocol Label Switching (MPLS) or other private packet-switched network (e.g., Metro Ethernet, Frame Relay, Asynchronous Transfer Mode (ATM), etc.), mobile networks (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The nodes can include any communication device or component, such as a computer, server, blade, hypervisor, virtual machine, container, process (e.g., running in a virtual machine, container, or other virtual partition), switch, router, gateway, host, device, network, and so forth.

In some embodiments, the data center network 100 may connect to one or more CSP networks via a private network connection (not shown) or the WAN transport network 112 for additional processing, memory, storage, network, and other computing resources in an architecture sometimes referred to as a hybrid cloud or multi-cloud. A hybrid cloud can include the combined computing resources of a private cloud (e.g., the data center network 100) and a public cloud (e.g., a CSP network) to perform workloads of an operator of the private cloud. A multi-cloud can combine computing resources of a private cloud with the resources of multiple public clouds.

Although the network fabric 102 is illustrated and described herein as a spine-and-leaf architecture, one of ordinary skill in the art will readily recognize that various embodiments can be implemented based on any network topology, including any enterprise or data center network fabric. Indeed, other architectures, designs, infrastructures, and variations are contemplated herein. For example, the principles disclosed herein are applicable to topologies including three-tier (e.g., core, aggregation, and access levels), fat tree, mesh, bus, hub and spoke, and so forth. In some embodiments, the leaf switches 106 can be top-of-rack switches configured according to a top-of-rack architecture. In other embodiments, the leaf switches 106 can be aggregation switches in any particular topology, such as end-of-row or middle-of-row topologies. In some embodiments, the leaf switches 106 can also be implemented using aggregation switches.

Moreover, the topology illustrated in FIG. 1 and described herein is readily scalable and may accommodate a large number of components, as well as more complicated arrangements and configurations. For example, the network may include any number of fabrics 102, which may be geographically dispersed or located in the same geographic area. Thus, network nodes may be used in any suitable network topology, which may include any number of physical servers, virtual machines, containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Figure 2:
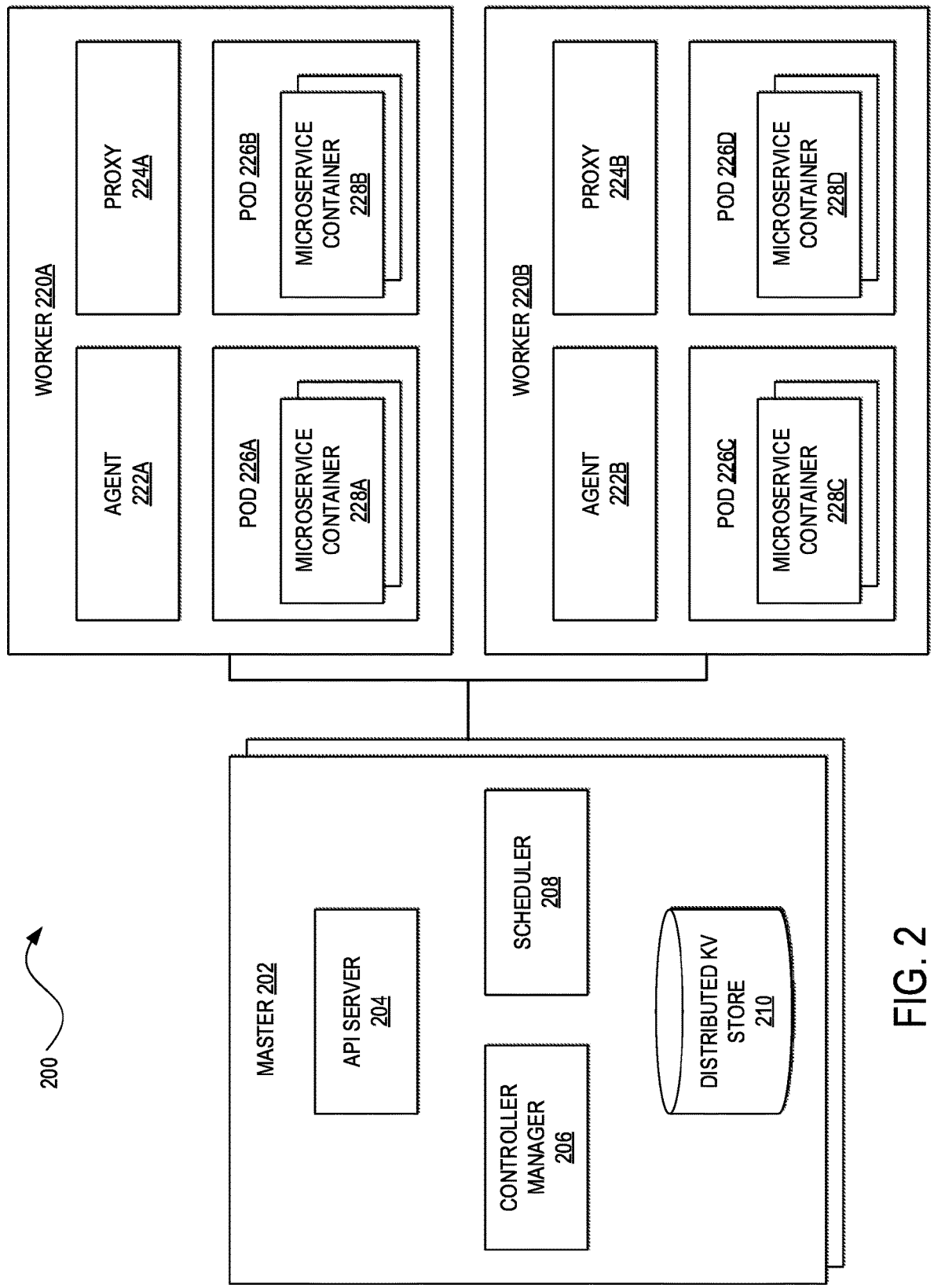
FIG. 2 illustrates a block diagram of an example of a container orchestrator in accordance with an embodiment.

FIG. 2 illustrates a block diagram of an example of a container orchestrator 200 that can be implemented for the container orchestrator/service mesh 112B. In some embodiments, the container orchestrator 200 may be based on Kubernetes. Kubernetes® is an open source container orchestration system for automating deployment, scaling, and management of containers across clusters of hosts (e.g., physical server, virtual machines, etc.). However, other embodiments may deploy other container orchestrators, such as Docker Swarm®, Apache Mesos®, Mesosphere® Marathon, and the like.

The container orchestrator 200 can comprise one or more clusters or collections of processing, memory, storage, network, and other computing resources that the container orchestrator 200 can use to run the various workloads of a network. Each cluster can comprise one or more hosts. In this example, the cluster includes a master 202 and workers 220A and 220B (collectively, 220) (sometimes also referred to as nodes, minions, slaves, etc.). Although there is one master 202 here, other embodiments may include multiple masters for redundancy and high availability.

The master 202 can operate as a control plane for the cluster. For example, the master 202 can be responsible for the global, cluster-level scheduling of pods (e.g., sets of one or more containers) and the handling of events (e.g., starting up a new pod when additional computing resources are needed). The master 202 can include an Application Programming Interface (API) server 204, a controller manager 206, a scheduler 208, and a distributed Key Value (KV) store 210. These components of the master 202 can run on any host in the cluster but usually run on the same (physical or virtual) machine without the workers 220.

The API server 204 (e.g., Kubernetes® kube-apiserver) can operate as the front-end to expose the API (e.g., Kubernetes® API) of the container orchestrator 200. The API server 204 can scale horizontally (e.g., scale by deploying more instances) as it can be stateless and store data in the distributed KV store 210.

The controller manager 206 (e.g., Kubernetes® kube-controller-manager, Kubernetes® cloud-controller-manager, etc.) can comprise a collection of controllers for monitoring the shared state of the cluster and making changes to the shared state. Each controller can be a separate process logically, but to reduce complexity, the collection of controllers can be compiled into a single binary and execute within a single process. The controller manager 206 can include a node controller, replication controller, endpoints controller, an account and token controller, route controller, service controller, volume controller, among other controllers. The node controller can be responsible for managing pod availability and bringing nodes back up when they go down. The replication controller can ensure that each replication controller instance in the container orchestrator 200 has the correct number of pods. The endpoints controller can control endpoint records in the API and manage domain name system (DNS) resolution of a pod or set of pods. The account and token controller can create accounts and API access tokens for new namespaces (e.g., names of resources of virtual clusters). The route controller can set up routes in the underlying infrastructure. The service controller can be responsible for creating, updating, and deleting network services (e.g., firewalling, load balancing, deep packet inspection, etc.). The volume controller can be responsible for creating, attaching, and mounting volumes.

The scheduler 208 (e.g., Kubernetes® kube-scheduler) can monitor newly created pods that have no worker node assigned to them, and select a worker node for them to run on. This can involve evaluation of individual and collective resource requirements, hardware/software/policy constraints, worker node affinity and anti-affinity specifications, pod affinity and anti-affinity specifications, data locality, inter-workload interference, and deadlines, among other factors.

The distributed KV store 210 (e.g., Kubernetes® etcd) can be a high-availability distributed data store. The container orchestrator 200 can use the distributed KV store 210 to store cluster state information. In a small, short-lived cluster, a single instance of the KV store 210 can run on the same host as other components of the master 202. For larger clusters, the distributed KV store 210 may comprise a cluster of hosts (e.g., 3-5 nodes) for providing redundancy and high availability.

The workers 220 can maintain running pods and provide a runtime environment for the container orchestrator 200. The container runtime (e.g., Docker®, Linux Foundation Containerd®, CoreOS® rktlet, Open Container Initiative™ runC, etc.) can be responsible for running containers. Each of the workers 220 can correspond to a single host, which can be a physical server or virtual machine. The workers 220A and 220B can respectively include agents 222A and 222B (collectively, 222) (e.g., Kubernetes® kubelet), proxies 224A and 224B (collectively, 224) (e.g., Kubernetes® kube-proxy, OVS, OVS/Contiv, etc.), and pods 226A and 226B and 226C and 226D (collectively, 226). The agents 222 can run on the workers 220 in the cluster and ensure that one or more microservice containers 228A, 228B, 228C, and 228D (collectively, 228) are running in the pods 226A, 226B, 226C, and 226D, respectively. The agents 222 can oversee communications with the master 202, including downloading keys, certificates, and the like from the API server 204, mounting volumes, or reporting the status of the workers 220 and the pods 226.

The pods 226 can help to manage groups of closely related microservice containers 228 that may depend on each other and that may need to cooperate on the same host to accomplish their tasks. The pods 226 can be scheduled together and run on the same physical server or virtual machine. The microservice containers 228 in each of the pods 226 can have the same IP address and port space; they can communicate via localhost or standard inter-process communication. In addition, the microservice containers 228 can have access to shared local storage on each of the workers 220. The shared storage can be mounted for each of the microservice containers 228.

The proxies 224 can be responsible for container networking, including low-level network housekeeping for the workers 220, reflection of local services, TCP and User Datagram Protocol (UDP) forwarding, finding cluster IPs through environmental variables or Domain Name System (DNS). In some embodiments, the container orchestrator 200 may employ a networking model that relates how the master 202, the workers 220, the pods 226, and the microservice containers 228 interact with one another, such as ensuring that the microservice containers 228 can communicate with one another without NAT, the workers 220 can communicate with the microservice containers 228 (and vice-versa) without NAT, and the IP address that the microservice containers 228 see themselves as are the same IP addresses that other network elements see them as. This networking model can assign IP addresses at the pod level such that the microservice containers 228 share an IP address and port space. This networking model can also enable the microservice containers 228 to reach other microservice containers' ports via localhost.

The container orchestrator 200 can enable intra-node communication or pod-to-pod communication within the same host via a local file system, IPC mechanism, or localhost. The container orchestrator 200 can also support various approaches for inter-node communication or pod-to-pod communication across hosts, including Layer 2 (L2) of the Open Systems Interconnection (OSI) model (e.g., switching), Layer 3 (L3) (e.g., routing), and overlay networking. The L2 approach can involve attaching an L2 network to a host's physical network interface controller (NIC) and exposing a pod directly to the underlying physical network without port mapping. Bridge mode can be used to enable the pod to interconnect internally so that traffic does not leave its host unless necessary. The L3 approach may not use overlays in the data plane, and pod-to-pod communication can occur over IP addresses leveraging routing decisions made by the hosts and external network routers. For example, pod-to-pod communication can occur over Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for pod-to-pod communication across hosts.

In some embodiments, the container orchestrator 200 can support labels (also sometimes referred to as tags, metadata, and the like) and selectors. Labels can be key-value pairs used to group together sets of objects, such as pods. Labels can also specify attributes of objects that may be meaningful and relevant to network users. There can be an N×N relationship between objects and labels. That is, each object can have multiple labels, and each label may be applied to different objects. Each label on an object may have a unique key. The label key can include a prefix and a name. The prefix can be optional. If the prefix exists, it can be separated from the name by a forward slash (/) and be a valid DNS subdomain. The prefix and the name can have specified maximum lengths (e.g., 253 and 63 characters, respectively). Names can start and end with an alphanumeric character (a-z, A-Z, 0-9) and include alphanumeric characters, dots, dashes, and underscores in between. Values can follow the same restrictions as names.

Label selectors can be used to select objects based on their labels, and may include equality-based selectors and set-based selectors. Equality (and inequality) based selectors can allow for selection of objects by key name or value. Matching objects must satisfy specified equality (= or ==) or inequality (!=) operators. Set-based selectors can enable selection of objects according to a set of values, including objects that are "in" or "not in" the set or objects having a key that "exists." An empty label selector can select every object in a collection. A null label selector (which may only be possible for optional selector fields) may select no objects.

In some embodiments, the container orchestrator 200 may employ a service model (e.g., Kubernetes® service model). A Kubernetes® service is an abstraction which defines a logical set of pods and a policy by which to access them (with each instance of a Kubernetes® service sometimes referred to as a microservice). The set of pods targeted by a Kubernetes® service can be determined by a label selector. Kubernetes® services can be published or discovered through DNS or environment variables. Kubernetes® services can be of different types, such as a ClusterIP, NodePort, LoadBalancer, or ExternalName Kubernetes® service. A ClusterIP can expose a Kubernetes® service on a cluster-internal IP such that the Kubernetes® service may only be reachable from within the cluster. A NodePort can expose a Kubernetes® service on each worker node's IP at a static port. A ClusterIP, to which the NodePort may route, can be automatically created when provisioning the NodePort. The NodePort can be contacted from outside the cluster by requesting<NodeIP>:<NodePort>. A LoadBalancer can expose a Kubernetes® service externally using a load balancer. NodePorts and ClusterIPs, to which the external load balancer routes, may be automatically created when provisioning the LoadBalancer. An ExternalName can map a Kubernetes® service to the contents of a specified Canonical Name (CNAME) record in DNS.

Applications can depend on various network functions from their infrastructure, such as load balancing, traffic management, routing, health monitoring, security policies, service and user authentication, protection against intrusion and DDoS attacks, and so forth. These network functions are conventionally implemented as discrete physical or virtual network appliances. Providing an application with these network functions may require logging into each appliance to provision and configure the network functions. This process was possible when managing dozens of monolithic applications but can be impractical in a microservice architecture that can require provisioning and configuration of hundreds or thousands of containers. A service mesh can resolve these issues of scale as well as provide monitoring, scalability, and high availability through APIs instead of dedicated appliances.

Figure 3:
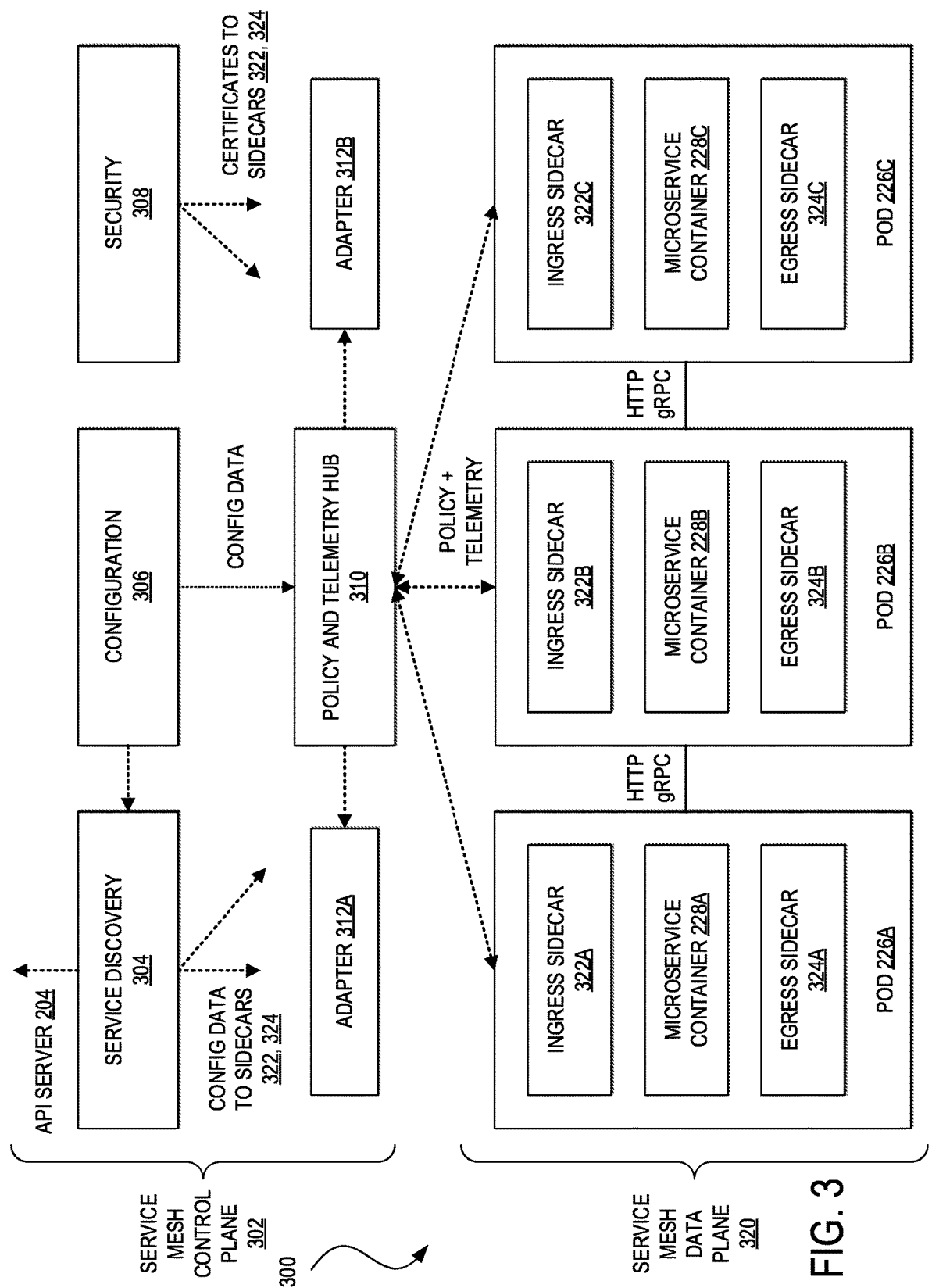
FIG. 3 illustrates a block diagram of an example of a service mesh platform in accordance with an embodiment.

FIG. 3 illustrates a block diagram of an example of a service mesh 300 that can be implemented for the container orchestrator/service mesh 112B. In some embodiments, the service mesh 300 may be based on the Istio® service mesh, Envoy™ sidecar proxy, and the Kubernetes® container orchestrator. However, other embodiments may utilize other service meshes (e.g., Linux Foundation Linkerd™, Hashicorp Consul®, etc.), proxies (e.g., NGINX®, HAProxy®, Containous® Traefik, etc.), and/or container orchestrators (e.g., Docker Swarm®, Apache Mesos®, Mesosphere® Marathon, etc.) without departing from the scope of the present disclosure. In this example, the service mesh 300 may be logically divided into a service mesh control plane 302 and a service mesh data plane 320. The service mesh control plane 302 can be responsible for managing and configuring traffic routing. In addition, the service mesh control plane 302 can enforce policy and collect telemetry. In this example, the service mesh control plane 302 can include a service discovery module 304, a configuration module 306, a security module 308, and a policy and telemetry hub 310.

The service discovery module 304 (e.g., Istio® Pilot) can provide service discovery, traffic management capabilities for intelligent routing (e.g., A/B testing, canary roll-outs, etc.), and resiliency (e.g., timeouts, retries, circuit breakers, etc.). The service discovery module 304 can convert high level routing rules that control traffic behavior into specific configurations for the pods 226 and propagate them to the pods at runtime. In this example, the service discovery module 304 can interface with the API server 204 for interconnecting the pods 226 and the microservice containers 228. However, the service discovery module 304 can generally abstract platform-specific discovery mechanisms and synthesize them into a standard format that any network element (e.g., physical server, virtual machine, container, network device, network appliance, etc.) can consume. This loose coupling can allow the service mesh 300 to run on multiple environments while maintaining the same interface for traffic management.

The configuration module 306 (e.g., Istio® Galley) can provide for configuration data validation, ingestion, processing, and distribution. The configuration module 306 can insulate the rest of the components of the service mesh 300 from the details of obtaining user configuration from the underlying container orchestrator (e.g., Kubernetes®, Docker Swarm®, Apache Mesos®, Mesosphere® Marathon, etc.).

The security module 308 (e.g., Istio® Citadel) can manage service authentication, authentication policy, role-based access control, Transport Layer Security (TLS) authentication, and keys/certificates. In some embodiments, the security module 308 can issue x509 certificates to the microservice containers 228, allowing for mutual TLS (mTLS) between the microservices and transparent encryption of their traffic. In some embodiments, the security module 308 may use microservice identity built into the underlying container orchestrator to generate certificates. This identity can allow for policy enforcement.

The policy and telemetry hub 310 (e.g., Istio® Mixer) can be a platform-independent module for enforcing access control and usage policies across the service mesh 300, and collect telemetry data from the pods 226A, 226B, and 226C. The policy and telemetry hub 310 can communicate with adapters 312A and 312B (collectively, 312) to interface with a specific infrastructure backend for metrics, logs, and so forth (e.g., Linux Foundation Prometheus®, StatsD, Linux Foundation Fluentd®, etc.). In some embodiments, controlling policy and telemetry in the service mesh 300 can involve defining service mesh configuration handlers, instances, and rules. The service mesh configuration handlers can specify the adapters 312 used by the service mesh 300 and how the adapters operate. The service mesh configuration instances can represent units of data operated upon by the adapters 312, as well as map request attributes to the adapters. The service mesh configuration rules can describe when the adapters 312 are called and which service mesh configuration instances are given to the adapters. The service mesh configuration rules can comprise match expressions and actions. The match expressions can control when to invoke the adapters 312, and the actions can determine the set of service mesh configuration instances to give to the adapters.

The data plane 320 can comprise ingress sidecar proxies 322A, 322B, and 322 (collectively, 322) and egress sidecar proxies 324A, 324B, and 324C (collectively, 324) within each pod 226A, 226B, and 226C, respectively. The sidecar proxies 322 and 324 can provide network connectivity to the microservice containers 228A, 228B, and 228C within each pod 226A, 226B and 226C, respectively. In general, a sidecar proxy is a containerized proxy that can operate alongside a microservice container to provide the microservice container with additional capabilities. For example, the sidecar proxies 322 and 324 can coordinate and control network communication between the microservice containers 228. The ingress sidecar proxies 322 can manage inbound traffic, and the egress sidecar proxies 324 can manage outbound traffic. Although the pods 226 include ingress sidecar proxies 322 and egress sidecar proxies 324 in this example, other embodiments may deploy a single sidecar proxy for managing both inbound and outbound traffic. In some embodiments, the sidecar proxies 322 and 324 may be implemented as Envoy™ proxies, which can provide dynamic service discovery, load balancing, Hypertext Transfer Protocol Version 1.1 (HTTP1.1), Hypertext Transfer Protocol Version 2 (HTTP2), and general-purpose Remote Procedure Call (gRPC) proxies (with or without mTLS), circuit breakers, health checks, staged rollouts with percentage-based traffic splits, fault injection, and rich metrics, among other features.

Figure 4:
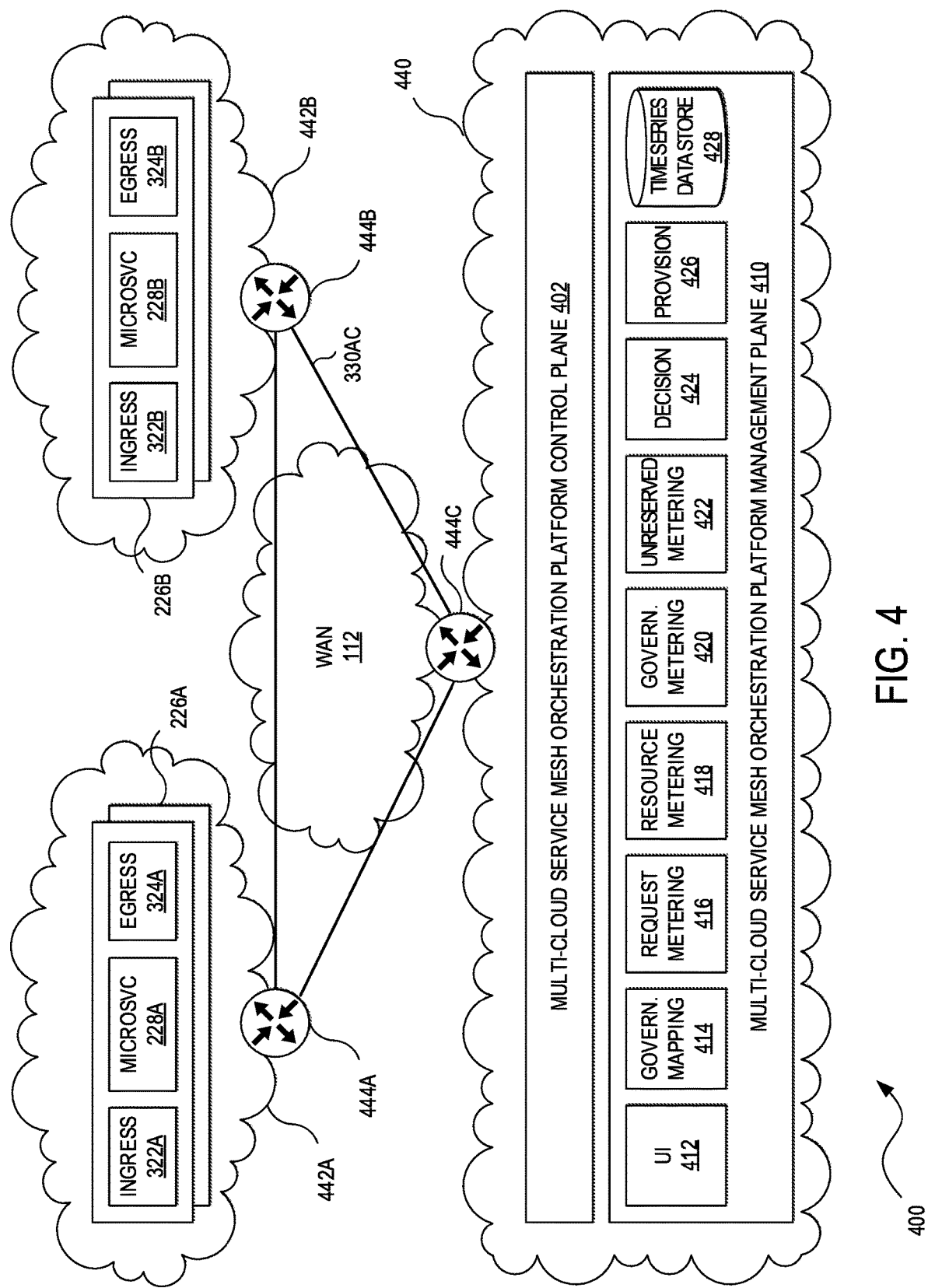
FIG. 4 illustrates a block diagram of an example of an multi-cloud service mesh orchestration platform in accordance with an embodiment.

FIG. 4 illustrates a block diagram of an example of a multi-cloud service mesh orchestration platform 400. In general, a multi-cloud service mesh is a mesh composed of interconnected microservice containers that can run within more than one underlying network but may be managed under a single administrative control plane. Sets of the microservice containers can form an application, and the multi-cloud service mesh can comprise one or more applications. Other application hierarchies are also possible, such as an application comprising a collection of layers, a layer comprising a collection of services, a service comprising a collection of microservices; an application comprising a collection of services and a service comprising a collection of microservices; or an application comprising a collection of microservices; and so forth. For purposes of simplicity and conciseness, an application can comprise a collection of microservices.

In this example, the multi-cloud service mesh orchestration platform 400 can include a control plane 402 and a management plane 410 deployed in a private network 440 (e.g., an enterprise network, a colocation provider network, etc.) and a data plane comprising the ingress sidecar proxy 322A and egress sidecar proxy 324A and the ingress sidecar proxy 322B and the egress sidecar proxy 324B respectively injected into the pods 226A and 226B. The pods 226A and 226B may reside within one or more physical servers or virtual machines of CSP networks 442A and 442B (collectively, 442) (e.g., Amazon AWS®, Google Cloud®, Microsoft Azure®, etc.). Although not shown in this example, other embodiments may also include one or more ingress sidecar proxies 322, one or more microservice containers 228, and one or more egress sidecar proxies 324 within one or more pods 226 on one or more physical servers or virtual machines of the private network 440. Each cloud of the multi-cloud service mesh orchestration platform 400 that includes microservice containers controlled by the platform may be referred to as a participating cloud.

An advantage of the multi-cloud service mesh orchestration platform 400, among others, is that all of the microservice containers 228 can look the same to clients, regardless of where the microservices are actually running. That is, it can be transparent to clients whether the multi-cloud service mesh is deployed in a single cloud or across multiple clouds. To achieve this behavior, a single logical control plane 402 can be used to manage all of the microservice containers 228. However, the single logical control plane 402 does not necessarily need to be a single physical control plane. For example, in other embodiments, the multi-cloud service mesh orchestration platform 400 can include multiple service mesh control planes that have replicated microservice and routing configurations in each participating cloud.

The control plane 402 can include at least one service mesh control plane (e.g., the service mesh control plane 302) to provide network interconnectivity between the microservice containers 228A and 228B deployed in the CSP networks 442A and 442B. For example, the control plane 402 can comprise the service discovery module 304, the configuration module 306, the security module 308, and the policy and telemetry hub 310. The control plane 402 can also include a container orchestrator control plane element (e.g., the master 202) for managing microservice containers, if any, deployed in the private network 440.

In this example, the CSP network 442A, the CSP network 442B, and the private network 440 can have universal connectivity (e.g., every pod in the mesh is reachable from anywhere using the same IP address) via a Virtual Private Network (VPN) established by gateways 444A, 444B, and 444C (collectively, 444) (e.g., VPN gateways, NAT gateways, Internet gateways, virtual private gateways, CSP routers, CSP load balancers, etc.), respectively. The CSP networks 442 can each run a simpler remote service mesh configuration that connects them to the control plane 402. However, other embodiments may deploy the control plane 402 within the CSP network 442A, and the simpler remote service mesh configuration within the CSP network 442B. These other embodiments may include the simpler remote service mesh configuration deployed in the private network 440. Still other embodiments may exclude the private network 440 such that the multi-cloud service mesh orchestration platform 400 may be implemented entirely in the cloud.

In configurations that deploy a service mesh control plane within a single cloud and where there is universal connectivity, such as in the example of FIG. 4, the service discovery module can manage network services via a container orchestrator's API server (e.g., the API server 204) deployed in each of the clouds participating in the multi-cloud service mesh, and the service discovery module can configure sidecar proxies (e.g., the ingress sidecar proxies 322 and the egress sidecar proxies 324) for all of the participating clouds. The IP addresses of the participating clouds do not overlap and DNS resolution for the microservice containers 228 on remote clouds may not be automatic. Thus, the microservice containers 228 may need to be replicated in every participating cloud.

In other embodiments where universal pod-to-pod connectivity may be difficult to achieve (e.g., no VPN connectivity), it may still be possible to configure a single control plane topology deploying service mesh gateways (e.g., Istio® gateways) and enabling a service mesh's location-aware service routing feature (e.g., Istio®'s split-horizon Endpoint Discovery Service (EDS)). This approach may also require connectivity to the container orchestrator's API servers from all of the participating clouds. In such configurations, a request from the sidecar proxies 322 or 324 in one cloud to a microservice container in the same cloud can be forwarded to the local microservice's IP address. If the destination workload is running in a different cloud, the remote cloud gateway's IP address can be used to connect to the microservice instead.

In still other embodiments, the multi-cloud service mesh orchestration platform 400 can include multiple service mesh control planes across multiple clouds with each participating cloud deploying a full service mesh control plane installation and each service mesh control plane managing its own endpoints. A single logical service mesh can be configured using a common root Certificate Authority (CA) and replicating shared services and namespaces in all participating clouds. Cross-cloud communication can occur over the service mesh gateways. The participating clouds can operate under shared administrative control for policy enforcement and security. Workloads in each participating cloud can access other local microservice containers using their DNS suffixes (e.g., foo.ns1.svc.cluster.local). To provide DNS resolution for microservice containers in remote clouds, a DNS server (e.g., CoreDNS) can be configured to handle microservice names of the form<name>.<namespace>.global. For example, calls from any cloud to foo.ns1.global may resolve to the FOO microservice in namespace NS1 of any cloud where it is running.

The management plane 410 can be used to deploy one or more applications that comprise multiple microservice containers interconnected via a service mesh that can span the multiple CSP networks 442 depending on TCOs, SLAs, and other governance information for the deployed applications. A TCO can quantity a monetary cost of a product or a service over a specified duration, such as a monetary cost for hardware (e.g., physical servers, physical memory, physical storage, rack infrastructure, switches, routers, etc.), software (e.g., operating system, virtualization management, applications, etc.), operational expenses (e.g., space, power, cooling, etc.), and labor (e.g., server administration, network administration, maintenance, etc.). Some examples of tools for determining monetary costs of products and services include the Cisco Unified Computing System™ (Cisco UCS®) TCO-Return On Investment (ROI) Advisory Tool, Cisco® Digital Network Architecture (Cisco DNA™) ROI Calculator, the Cisco Tetration Analytics™ TCO tool, CSP TCO calculators, among others.

Cost can also refer more generally to other metrics, such as availability (e.g., number of hours or days of downtime, percentage of time an application was unavailable, etc.), reliability (e.g., error rate, accuracy of results, Mean Time To Failure (MTTF), Mean Time Between Failure (MTBF), Rate of Occurrence of Failure (RCF), Mean Time to Repair (MTTR), Probability of Failure on Demand (PFD), etc.), security (e.g., number of security breaches detected, number of security breaches prevented, etc.), performance (e.g., average response time, percentile of requests returned within a specified response time (e.g., 0.1 seconds), throughput, percentage of requests successfully processed, etc.), resource utilization (e.g., percentage of time a resource is in use, percentage of a resource's capacity is in use, amount of requests that must be queued, etc.), power consumption (e.g., Power Usage Effectiveness (PUE) (e.g., total facility energy usage/computing infrastructure energy usage, Data Center Infrastructure Efficiency (e.g., computing infrastructure energy usage/total facility energy usage), Gigabytes Per Kilowatts (GPK) per hour, Kilowatts per Terabytes (KPT) per hour, etc.), user time (e.g., number of hours or days spent by a user for developing, testing, deploying, or managing an application), and so forth. Some examples of tools for determining general costs of products and services include the Cisco® Digital Network Architecture (Cisco DNA™) ROI Calculator for determining cost in terms of provisioning time savings and troubleshooting time savings and the Cisco Tetration Analytics™ ROI tool for determining cost in terms of applications troubleshooting speed, application lifecycle management time savings, the number of security breaches detected, the number of security breaches prevented, among others.

An SLA can be a contract between a CSP and a customer (e.g., an enterprise, a corporate employee, an end user, or other consumer of a cloud service) setting the terms by which the CSP makes its computing resources available to the customer. The SLA can define the services provided by the CSP and/or requested by the customer and how to measure the services as agreed to by the parties, among other terms. The parameters of the SLA can vary depending on the capabilities of the CSP and/or customer requirements, but can include requirements regarding performance, availability, reliability, security, computing resource utilization, power consumption, and/or specific quantifiable metrics, such as response time, throughput, bandwidth, latency, jitter, error rate, downtime per week, MTTF, MTBF, RCF, MTTR, PFD, and the like.

The management plane 410 can include a User Interface (UI) 412, a governance mapping module 414, a request metering module 416, a resource metering module 418, a governance metering module 420, an unreserved metering module 422, a decision module 424, a provisioning module 426, and a time series data store 428, among other modules and components. Administrators can utilize the UI 412 to deploy and manage a service mesh application, and optimize aspects of its operation according to user-defined criteria, such as minimizing TCO while satisfying specified QoS levels set forth in an SLA; maximizing certain application performance metrics (e.g., availability, accuracy, user satisfaction, etc.), minimizing other application performance metrics (e.g., response time, error rate, resource utilization, etc.), and/or maximizing capacity within a prescribed budget; or maintaining specified levels of load distribution to protect against vendor lock-in, ensure compatibility across multiple CSPs, increase reliability, decrease effectiveness of Distributed Denial of Service (DDoS) attacks; and so forth.

Each cloud, whether private or public, may use a different approach for managing processing, memory, storage, network, and other computing resources. The UI 412 can abstract these differences to provide a single interface that can offer seamless deployment of service mesh applications across multiple clouds without the need for cloud-specific APIs. In some embodiments, the UI 412 may utilize a platform-independent and portable object model that combines infrastructure-automation and application-automation layers in a single, deployable blueprint (sometimes referred to as an application profile). Application profiles can include TCO constraints, SLA requirements, and other criteria provisioning, deployment, and operation of an application, as well as outline the relationship between deployment environments, applications, application components, and so forth. The application profile can be encoded using Extensible Mark-up Language (XML), JavaScript® Object Notation (JSON), Yet Another Mark-up Language (YAML), or other suitable format, and can include a description of the topology of an application, infrastructure and network service requirements, a descriptions of deployment artifacts (e.g., packages, binaries, scripts, data, etc.), orchestration procedures needed to deploy, configure, and secure the application, run-time policies that guide ongoing lifecycle management, upgrade information, backup-and-restore information, and so forth.

The governance mapping module 414 can process and translate TCOs, SLAs, and other criteria governing the provisioning, deployment, and operation of a service mesh application at various levels of applicability, such as from the highest level of an application hierarchy (e.g., application level) to lower levels of the application hierarchy (e.g., layer level, service level, microservice level, etc.). For example, the governance mapping module 414 can map a TCO constraint (e.g., a Not to Exceed (NTE) budget for the application, an end-to-end TCO per client request to the application, etc.) for a service mesh application to individual microservice-level monetary cost constraints for each microservice container 228 of the application.

As another example, the governance mapping module 414 can map corporate-level SLAs (e.g., SLAs that cover every user of an organization), customer-level SLAs (e.g., SLAs that cover a particular group within an organization), application-level SLAs (e.g., SLAs that cover an application), or other SLAs of broad applicability to layer-level SLAs, service-level SLAs, microservice-level SLAs, or other SLAs of more specific applicability. For instance, an application-level SLA may specify an average response time or a maximum response time for an application at the broadest level of applicability. The response time can be defined as the amount of time that a reply is provided to a client request to the application. The governance mapping module 414 can allocate the application response time specified by the application-level SLA among constituent response times for the microservice-level SLA of each microservice container 228 of the application that may be executed to provide the reply to the request.

As another example, an application-level SLA may specify a maximum permissible error rate for an application at the broadest level of applicability. The error rate can be defined as the percentage of client requests resulting in an error relative to all client requests to the application. The governance mapping module 414 can assign the maximum permissible error rate specified by the application-level SLA as the maximum permissible error rate for the microservice-level SLA of each microservice container 228 of the application that may be executed to provide the reply to the request.

As yet another example, an application-level SLA may specify a minimum availability rate for an application at the broadest level of applicability. Availability can be defined as the percentage of time that the application is accessible to end users. The governance mapping module 414 can assign the percentage of time the application must be available as specified by the application-level SLA as the percentage of time each microservice container 228 of the application must be available for the microservice-level SLA of each microservice that may be executed to provide the reply to the client request.

The request metering module 416 can track requests or changes to existing requests on ingress to and/or egress from various levels of the application hierarchy, including requests to the application, intermediate components, and the microservice containers 228 for more granular client request information, such as the date and time a request was made, the identity of the user or other entity making the request, the source of the request (e.g., source IP address, source domain name, etc.), the agent through which the request was made, error information, the request parameters, the response elements, the request identifier, the requested action, the cloud/region identifier, the request type, the resources accessed by the request, the recipient of the request (e.g., recipient user identifier, destination IP address, destination source name, etc.), and so forth. Over time, the request metering module 416 can identify request load patterns and trends at various intervals, such as the expected request load at certain hours of the day, certain days of the week, certain specific dates (e.g., holidays, ends of quarters) or date ranges (e.g., seasons), and so forth.

In some embodiments, the request metering module 416 can invoke the logging or monitoring APIs of the CSPs (e.g., AWS CloudTrail®, Google Compute Engine™ Activity Logs, Microsoft Azure® Monitor, etc.) to obtain the request metrics. The APIs may be accessible as Restful State Transfer (REST) API endpoints. REST is a design pattern in which a server enables a client to access and interact with resources via Uniform Resource Identifiers (URIs) using a set of predefined stateless operations (referred to as endpoints). The APIs may also be accessible as SDKs for various programming languages or platforms, such as C++, Go, Java®, JavaScript®, Microsoft .NET®, Node.js, PHP: Hypertext Preprocessor (PHP), Python™ Ruby, and the like. Alternatively or in addition, the request metering module 416 can interface with the control plane 402, and in particular, the policy and telemetry hub 310 of the control plane 402, which can in turn interface with sidecar proxies (e.g., the ingress side car proxies 322 and/or the egress sidecar proxies 324) to obtain the request metrics. In some embodiments, the request metering module 416 can store the usage and consumption information in the time series data store 428 (e.g., InfluxData InfluxDB®, Timescale TimescaleDB®, OpenTSDB, Graphite, etc.). Thus, the request metering module 416 may be capable of capturing request metrics at various levels of granularity, including at the microservice level, the service level, the layer level, the application level, and so on.

The resource metering module 418 can track the inventory of computing resources (e.g., CPU, GPU, memory, storage, network bandwidth, etc.) reserved and utilized for deploying the service mesh application, including all computing resources for deploying the application, intermediate components, and the microservice containers 228. Over time, the resource metering module 418 can identify resource utilization patterns and trends, including expected resource utilization rates at various intervals as well as correlations between request load and resource utilization rates. In some embodiments, the resource metering module 418 can invoke the logging or monitoring APIs of the CSPs to determine the amounts of computing resources reserved and actually used for deploying the application, intermediate components, and the microservice containers 228. Alternatively or in addition, the resource metering module 418 can obtain the resource utilization metrics from the control plane 402, and in particular, the policy and telemetry hub 310, which can in turn learn this information from the physical hosts or virtual machines on which the microservice containers 228 run via the container orchestrator's API server 204. In some embodiments, the resource metering module 418 can store the resource utilization information in the time series data store 428. Thus, the resource metering module 418 may be capable of capturing resource utilization metrics at various levels of granularity, including at the microservice level, service level, layer level, application level, and so forth.

The governance metering module 420 can monitor the service mesh application to ensure the application complies with any TCO constraints, SLA requirements, and other criteria for governing the provisioning, deployment, and operation of the application at various levels of granularity. The governance metering module 420 can track TCO and TCO constraints for the application and individual component-level monetary costs and constraints for the application's layers, services, and microservices to ensure the application adheres to its TCO constraints. The governance metering module 420 can also identify Key Performance Indicators (KPIs) associated with the SLAs of the service mesh application and its components (e.g., layers, services, microservices, etc.) via the governance mapping module 414, and collect the KPIs over time. The governance metering module 420 can identify patterns and trends among the request metrics captured by the request metering module 416, the resource utilization metrics captured by the resource metering module 418, monetary cost metrics, the SLA KPIs, and other governance metrics captured by the governance metering module 420. For example, given metrics for request load, computing resource utilization, available reserved computing resources, monetary cost metrics, SLA KPIs, and other governance metrics, the governance metering module 420 can determine whether the individual monetary cost constraints, SLA requirements, and other governance metrics for the microservice containers 228 are met. In some embodiments, the governance metering module 420 may also be capable of determining the computing resources, such as the type of CPU, number of CPU cores, CPU processing rate, type of GPU, number of GPU cores, GPU processing rate, amount of memory, type of storage (e.g. Hard Disk Drive (HDD), Solid State Drive (SSD), Non-Volatile Memory express (NVMe) SSDs, etc.), amount of storage, storage bandwidth (e.g., in Megabytes per second (Mbps)), network performance (e.g., in Gigabits per second (Gbps)), operating system, type of hypervisor or other virtualization management software, and so forth, that may be required to satisfy the monetary cost constraints, SLA requirements, and other governance metrics at various levels of the application hierarchy.

In some embodiments, the governance metering module 420 can invoke the logging or monitoring APIs of the CSPs to obtain the governance metrics. Alternatively or in addition, the governance metering module 420 can interface with the policy and telemetry hub of the control plane 402 to obtain the governance metrics. In some embodiments, the governance metering module 420 can store the governance metrics in a time series data store, which can be the same time series data store utilized by the request metering module 416 and/or the resource metering module 418, or a different time series data store.

The unreserved metering module 422 can track the availability, monetary cost, performance, and other metrics of unreserved compute instances of the CSP networks 442 that can be provisioned for deploying the microservice containers 228. In some embodiments, the unreserved metering module 422 can invoke the unreserved compute instance provisioning APIs of the CSP networks 442 (e.g., EC2® Spot Instances, Google Cloud® Pre-emptible VM Instances, Azure® Low-priority VMs, etc.) to determine the availability of unreserved compute instances. In general, the unreserved compute instance provisioning APIs can allow customers to purchase unreserved compute instances in the CSP networks 442 at lower costs (e.g., up to 80-90% discount) than reserved compute instances. In some embodiments, the unreserved metering module 422 can store metrics for the unreserved compute instances in the time series data store 428 for identifying patterns and trends regarding the availability, monetary cost, and performance of the unreserved compute instances of the CSP networks 442.

The decision module 424 can determine whether to scale up, scale down, or maintain the same amounts of computing resources for deploying the service mesh application, intermediate components, and the microservice containers 228 based on the volume of client requests to the application, intermediate components, and the microservice containers (e.g., obtained via the request metering module 416), computing resources utilized by and reserved for the application, intermediate components, and the microservice containers (e.g., obtained via the resource metering module 418), and governance metrics relative to governance requirements for the application, intermediate components, and the microservice containers (e.g., obtained via the unreserved metering module 422). In addition, the decision module 424 can determine how and where to provision the computing resources for the application, intermediate components, and the microservice containers 228 based on the availability of unreserved computing resources and monetary cost constraints, SLA requirements, and other governance information applicable at various levels of the application hierarchy.

In some embodiments, the decision module 424 can include a multi-agent reinforcement learning system for selecting the actions to perform for provisioning, deploying, and operating the service mesh application, intermediate components, and the microservice containers 228. As discussed, a reinforcement learning system can include a learning agent can automatically learn (i.e., without direct human intervention) by interacting with its environment. The learning agent can receive rewards by performing correctly and costs for performing incorrectly. The agent can learn by maximizing its reward and minimizing its cost on the basis of a policy, a reward function, a value function, and, optionally, a model of the environment. A policy can define the learning agent's behavior by mapping states to actions. The policy can be a simple function or lookup table in some implementations, or may require a complex computation, such as a search process, in other situations. A policy is generally stochastic, and can specify a probability for each action the learning agent can perform for a given state.

The reward function can represent the objective of the learning agent. On each time step, the environment can send to the learning agent a reward (e.g., a scalar value) indicating whether the transition from one state to the next state as a result of an action is correct or incorrect for the agent. The agent's goal can be to maximize the sum of rewards (or minimize the cumulative costs) over the long run. Different reward (or cost) functions are possible, such as pure delayed reward (or cost) functions, minimum time to objective functions, and game theory functions. Pure delayed reward (or cost) functions can set rewards for all states to zero except the end state, which can be a desired end state (e.g., +1) or a state that must be avoided (e.g., −1). Minimum time to objective functions can lead the agent along the shortest path to the desired state. For example, the minimum time to objective functions can set rewards for all transitions to −1 except the transition to the desired state, whose reward can be set to 0. To maximize reward, the agent can learn the actions that minimize the time it takes to reach the desired state. Game theory functions can combine multiple agents that may each take an independent action, and aggregate rewards of the multiple agents to determine the best outcome for the agents (e.g., all agents in a cooperative situation or subsets of agents in an adversarial situation) both in the short-term and the long-term.

While the reward function can provide immediate feedback as to whether the transition from one state to the next is correct or incorrect, the value function can specify what is correct or incorrect in the long run. The value function can map a state to a state value (e.g., the accumulation of rewards received when starting in that state to an end state). A state may yield a low immediate reward but can still have a high value if it is regularly followed by other states that yield high rewards. Alternatively, a state may yield a high immediate reward but may have a low value if it is regularly followed by other states that yield low rewards.

Some reinforcement learning systems can also include a model of the environment to allow inferences to be made about how the environment will behave for a given state and action, such as the expected next state and next reward.

Reinforcement learning problems can be modeled as Markov Decision Processes (MDPs). The MDP is a discrete time stochastic control process that can be defined by a tuple $\{S, A, P, R\}$, where S is a set of possible states of the environment, A is a set of possible actions, P: $S \times A \times S \rightarrow [0,1]$ is the state transition probability function, and R: $S \times A \times S \rightarrow \mathbb{R}$ is the reward function. At each time step t, $s_t \in S$ describes the state of the environment. The agent can alter the state at each time step by taking actions $a_t \in A$. As a result of the action at, the environment changes its state from $s_t$ to some $s_t+1 \in S$ according to the state transition probabilities given by P: the probability of ending up in state $s_t+1$ given that action at is performed at state action $s_t$ is $P(s_t, a_t, s_t+1)$. The agent receives a scalar reward $r_{t+1} \in \mathbb{R}$, according to the reward function R: $r_{t+1}=R(s_t,a_t,s_t+1)$. This reward evaluates the immediate effect of action at (i.e., the transition from the state $s_t$ to the state $s_{t+1}$). The behavior of the agent can be described by its policy w, which is typically a stochastic function, $\pi: S \times A \rightarrow [0,1]$. The goal of the MDP (and other reinforcement learning systems) can be to maximize, at each time step t, the expected discounted return $G_t = \Sigma_{k=0}^{\infty} \gamma^k R_{t+k+1}$, where $\gamma \in [0,1)$ is a discount factor (e.g., a floating point number between 0 and 1 in which future rewards are given greater weight the closer $\gamma$ is to 1 and less weight the closer $\gamma$ is to 0). This can involve determining the optimal value function or the value function that returns a higher value than other functions for all states: $V^*(s) = \max_\pi V_\pi(s)$ for all $s \in S$, or the optimal action-value function: $Q^*(s,a) = \max_\pi Q_\pi(s,a)$ for all $s \in S$ and for all $a \in A$. That is, the optimal value of taking an action a for a state s is the expected immediate reward plus the expected return (e.g., the expected discounted optimal value attainable from the next state). A greedy policy is deterministic and can pick the action with the highest Q-value for every state: $n^*(s) = \arg\max_a Q^*(s,a)$. The agent can achieve the learning goal by first computing $Q^*$ and then selecting actions by the greedy policy, which is optimal (i.e., maximizes the expected return) when applied to $Q^*$. Some examples of approaches for finding the optimal value function or the optimal action-value function include dynamic programming, value iteration, Q-learning, advantage learning, temporal differencing, among others.

The generalization of the MDP to the multi-agent case is the Stochastic Game (SG), which can be represented by a tuple $\{S, A_1, \ldots, A_n, P, R_1, \ldots, Rn\}$, where n is the number of agents, S is a set of possible states of the environment, $A_1, \ldots, A_n$ are sets of possible actions of each agent yielding the joint action set $A=A_1 \times \ldots \times A_n$, P: $S \times A \times S \rightarrow [0,1]$ is the state transition probability function, and $P_i: S \times A \times S \rightarrow \mathbb{R}$, where $i=1, \ldots, n$ are the reward functions of each agent. In the multi-agent case, the state transitions are the result of the joint action of all the agents, $a_t = [a_{1,t}^T, \ldots, a_{n,t}^T]$, where $a_t \in A$, $a_{i,t} \in A_i$. (T is the transpose of the vector). Consequently, the rewards $R_{i,t+1}$ and the returns $G_{i,t}$ also depend on the joint action. The policies $\pi_i: S \times A \rightarrow [0,1]$ form the joint policy $\pi$, and the Q-values of each agent can depend on the joint action and may be conditioned on the joint policy, Q: $S \times A \rightarrow \mathbb{R}$. If $\pi_1 = \ldots = \pi_n$, then all the agents have the same goal of maximizing the same expected return, and the SG is fully cooperative. If $n=2$ and $\pi_1 = -\pi_2$, then the two agents have opposite goals, and the SG is fully competitive. Mixed SGs are neither fully cooperative nor fully competitive. Some examples of approaches for determining the optimal value function or the optimal value-action function for fully cooperative SGs include Joint Action Learners (JAL), Frequency Maximum Q-Value (FMQ), Team Q-learning, Distributed Q-learning, and Optimal Adaptive Learning (OAL), among others. An example of determining the optimal value function or the optimal value-action function for a fully competitive SG includes Minimax Q-learning. Some examples of determining the optimal value function or the optimal value-action function for mixed SGs include Correlated Equilibrium (CE) Q-learning, Nash Q-learning, Non-Stationary Converging Policies (NSCP), and Asymmetric Q-learning, among others.

In some embodiments, the decision module 424 can model its decision-making as a generalized MDP or SG. As a simple example, the UI 412 can receive a request to deploy an application as a service mesh application. The service mesh application can be associated with governance information including user-defined criteria that response times for the application not exceed a maximum response time and to minimize TCO. Each microservice container of the application can represent a learning agent of a fully cooperative SG having the common goal of minimizing TCO while constrained by the SLA requirement. The decision module 424 can define the state space for each microservice container as the set of possible deployment configurations for that microservice container (e.g., deployment in a first CSP network using a reserved compute instance, deployment in a second CSP network using a reserved compute instance, deployment in an unreserved compute instance in the first CSP network, deployment in an unreserved compute instance in the second CSP network, etc.). The decision module 424 can define the action space for each microservice container as the transitions from one (valid) state to another (e.g., doing nothing and remaining deployed in its current compute instance; provisioning a reserved compute instance in the second CSP network, migrating the microservice container to the newly provisioned compute instance, terminating or hibernating the provisioned compute instance in the first CSP network, etc.; provisioning an unreserved compute instance in the first CSP network, migrating the microservice container to the newly provisioned compute instance, terminating or hibernating the previously provisioned compute instance; etc.). The decision module 424 can define the probability of transition from one state to another equally among the valid states. The decision module 424 can define the reward function for each microservice container to return a−1 if the application violates the SLA requirement (e.g., having a response time greater than the maximum response time) and a reward representing the inverse of CSP's monetary costs for that microservice container otherwise. For the first time step, the decision module 424 can randomly select an action for each microservice container that transitions from the initial state to the next state and receive a reward as a result of the state transition. The decision module 424 can update Q-values for the state-action pair with the reward and the expected return: $Q_{t+1}(s_t, a_t)=r_{t+1}+\gamma \max_a Q(s_{t+1}, a)$ until transitioning to an end state. The process can be repeated iteratively for a first time period until the learning agents determine the optimal state-action function Q*. The optimal policy for each agent can be learned by applying a greedy policy to Q*. Table 1 sets forth an example of pseudo-code for Q-learning.

TABLE 1

Example of Pseudo Code for Q-Learning

| | |
|---|---|
| 1. | Initialize Q(s, α) (e.g., set Q(s, α) to 0) |
| 2. | Repeat for each episode: |
| 3. | Initialize s |
| 4. | Repeat for each step of episode: |
| 5. | Select and perform action α |
| 6. | Observe reward r, and new state s' |
| 7. | Update Q(s, α) ← γ max$_α$, Q (s', α') |
| 8. | Update s ← s' |

For example, if the decision module 424 determines to maintain current amounts of computing resources for a microservice container currently deployed using a reserved compute instance, then the decision module 424 may check for the availability of unreserved compute instances (in a current CSP network in which the microservice container is currently deployed or one or more different CSP networks). If unreserved compute resources are available, the decision module 424 may evaluate whether deploying the microservice container using the unreserved computing instance satisfies the individual monetary cost constraint, SLA requirements, or other conditions for governance of the microservice container (including any performance hit for migrating the microservice container). If so, the decision module 424 may determine to provision the unreserved computing instance to deploy the microservice container, and to hibernate or terminate the reserved computing instance.

As another example, if the decision module 424 determines that an additional computing instance must be provisioned for a microservice container currently deployed using a reserved computing instance, then the decision module 424 may check for the availability of unreserved computing resources. If unreserved computing resources are available, the decision module 424 may evaluate whether deploying the microservice container using the unreserved computing instance better satisfies the individual monetary cost constraint, SLA requirements, and other criteria for governing the microservice container. If so, the decision module 424 may determine to provision the unreserved computing instance to deploy the microservice container and additional instances (e.g., replicas) of the microservice container, and to hibernate or terminate the reserved computing instances. If not, the decision module 424 may determine to continue deploying the microservice container using the reserved computing instance. In addition, the decision module 424 may determine how and where to provision compute instances for the additional instances of the microservice containers, including whether to provision unreserved computing instances (if available) or reserved computing instances and which CSP network to provision the computing instances.

As yet another example, if the decision module 424 determines to reduce the amount of computing resources provisioned for a microservice container, then the decision module 424 may evaluate each instance of the microservice container with respect to its governance criteria to identify the compute instances to hibernate or terminate. In some embodiments, the decision module 424 may evaluate the remaining instances of the microservice container to determine whether migrating them to other compute instances (e.g., unreserved compute instance) and/or to a different CSP network optimizes their governance criteria.

For a second time period, the provisioning module 426 can perform the actions selected by the decision module 424 regarding how and where the microservice containers 228 should be deployed (e.g., as selected by the reinforcement learning policy), including continuing deployment at current levels using currently provisioned compute instances, instantiating unreserved compute instances or reserved compute instances in their current CSP networks or different CSP networks and migrating existing microservice containers to the newly provisioned compute instances, and/or hibernating or terminating currently provisioned compute instances. In some embodiments, the provisioning module 426 can invoke the unreserved compute instance APIs (e.g., EC2® Spot Instances, Google Cloud® Pre-emptible VM Instances, Azure® Low-priority VMs, etc.) and/or other provisioning APIs of the CSP networks 442 (e.g., EC2®, Amazon Lightsail®, Amazon® Elastic Container Service, AWS Fargate®, Google Compute Engine™, Google® Kubernetes Engine, Azure® Virtual Machines, Azure® Virtual Machine Scale Sets, Azure® Kubernetes Service, Azure® Container Instances, etc.) to deploy the microservice containers 228 within the CSP networks 442 selected by the decision module 424. Alternatively or in addition, the provisioning module 426 can invoke the API server of the container orchestrator running in a selected CSP network to deploy the microservice containers 228. The provisioning module 426 can also inject the ingress sidecar proxies 322 and the egress sidecar proxies 324 to interconnect the microservice containers 228.

Figure 5A:
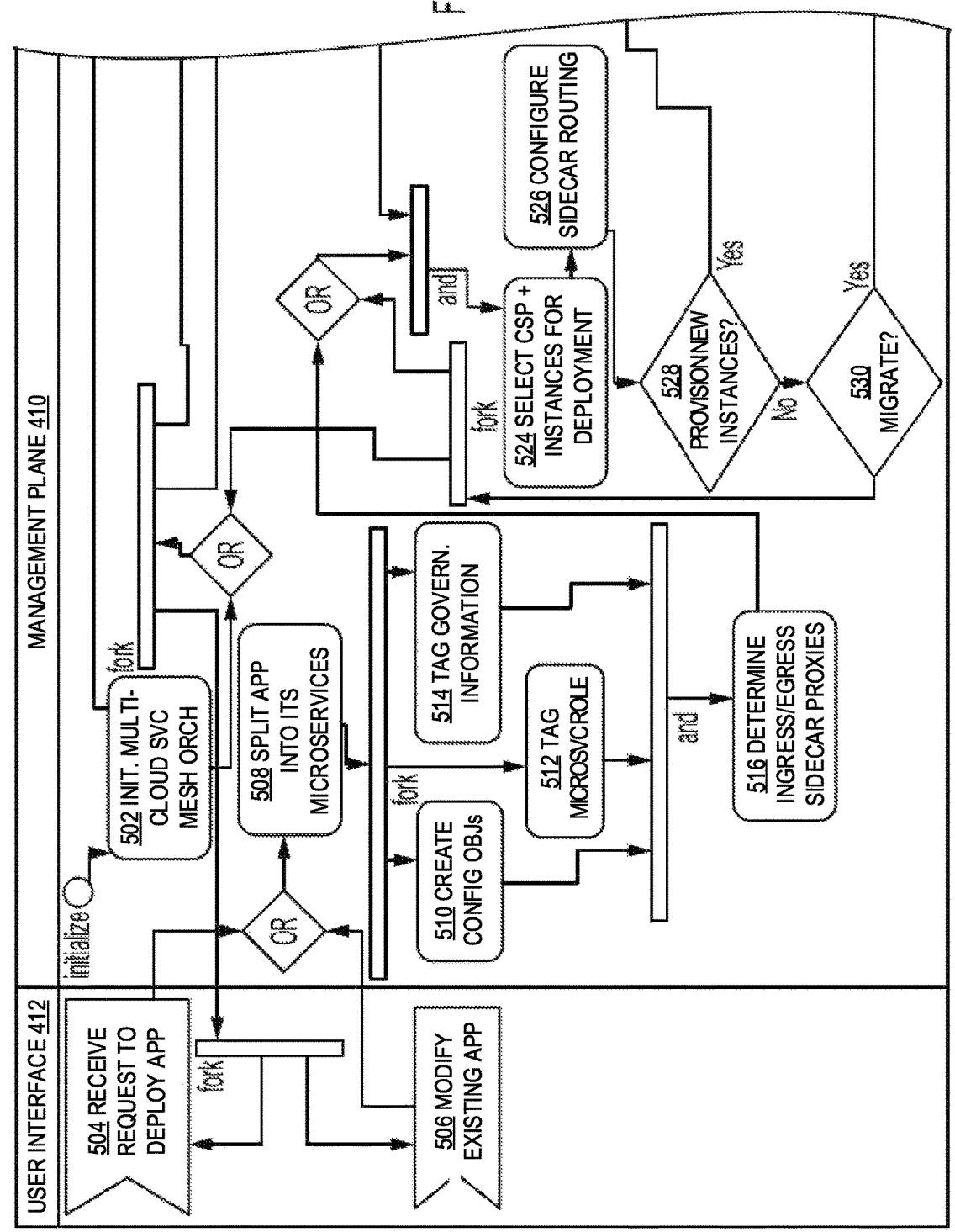
FIGS. 5A and 5B illustrate a Uniform Modeling Language (UML) activity diagram of an example of a workflow for orchestrating microservice containers of a service mesh application in a multi-cloud environment in accordance with an embodiment.
Figure 5B:
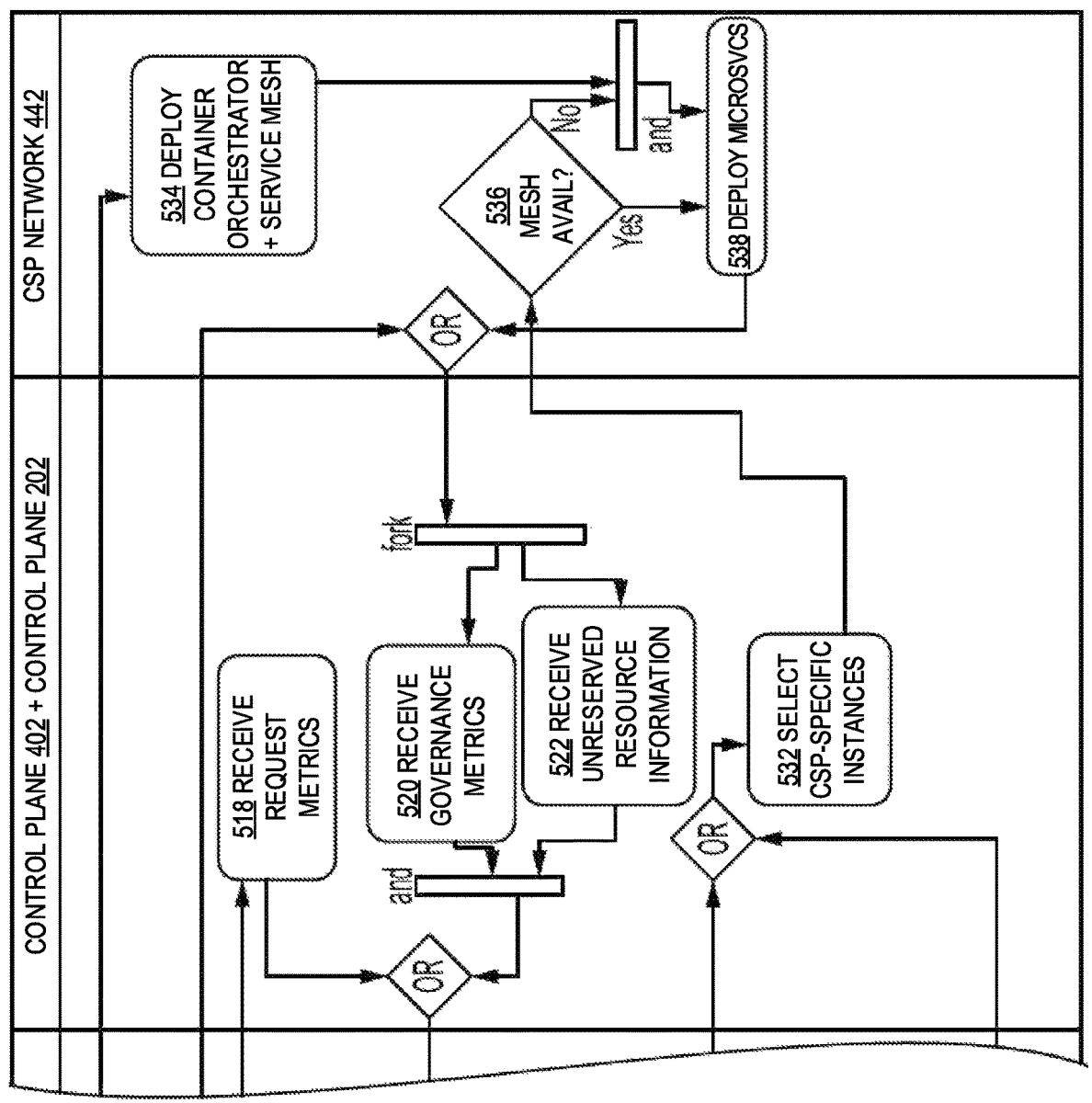

FIGS. 5A and 5B illustrate a Uniform Modeling Language (UML) activity diagram of an example of a workflow 500 for orchestrating microservice containers of a service mesh application in a multi-cloud environment. One of ordinary skill will understand that, for any workflow, method, or process discussed herein, there can be additional, fewer, or alternative activities, actions, or steps performed in similar or alternative orders, or in parallel, within the scope of the various embodiments unless otherwise stated. The workflow 500 can be performed by one or more processors of a computing system (e.g., the multi-cloud service mesh orchestration platform 400) including memory and having instructions that, when executed by the one or more processors, cause the computing system to perform the activities of the workflow 500. For example, the workflow 500 can be performed at least in part by a user interface (e.g., the user interface 412), a management plane (e.g., the management plane 410), a control plane (e.g., the control plane 402 and the master 202 in participating clouds), and a data plane (e.g., the sidecar proxies 322 and 324 running alongside the microservice containers 228 in participating clouds) of a multi-cloud service mesh orchestration platform (e.g., the multi-cloud service mesh orchestration platform 400) and participating clouds (e.g., the CSP networks 442) of the platform.

The workflow 500 can begin with an activity 502 for initializing the multi-cloud service mesh orchestration platform. In some embodiments, the multi-cloud service mesh orchestration platform can be a part of a dedicated physical network appliance, and initializing the platform can include physically deploying it. Alternatively or in addition, initializing the platform can include provisioning the computing resources in a first cloud (e.g., the private network 440, the CSP network 442A, etc.) and deploying the multi-cloud service mesh control plane and management plane using the provisioned resources. In other embodiments, the multi-cloud service mesh orchestration platform can be a software suite that can be obtained from a CSP marketplace (e.g., AWS® Marketplace, Google Cloud™ Marketplace, Azure® Marketplace, etc.) and may deployed within a corresponding CSP network.

Once the control plane and the management plane of the multi-cloud service mesh orchestration platform is initialized, the workflow 500 can proceed to an activity 534 in which the multi-cloud service mesh orchestration platform can deploy control elements for a container orchestrator (e.g., the container orchestrator 200) and a service mesh platform (e.g., the service mesh 300) within each participating cloud, such as a master (e.g., the master 202) and a full service mesh installation (e.g., the service mesh control plane 402) or a simpler remote service mesh configuration that connects the remote service mesh to a single service mesh control plane. In some embodiments, the multi-cloud service mesh orchestration platform can include a provisioning module (e.g., the provisioning module 426) for invoking the provisioning APIs of a private network and/or CSP networks to request for virtual servers and deploy the control elements. In some embodiments, the multi-cloud service mesh platform may utilize a multiple service mesh control plane topology such that every participating cloud can run its own service mesh control plane. In other embodiments, the multi-cloud service mesh orchestration platform may utilize a single service mesh control plane topology such that remote clouds may run the simpler remote service mesh control plane configuration that connects the remote clouds to the single service mesh control plane.

After the container orchestrator and service mesh are deployed in each participating cloud, the workflow 500 can proceed to an activity 504 in which the multi-cloud service mesh orchestration platform may receive a request to deploy an application as a service mesh application or an activity 506 in which the multi-cloud service mesh orchestration platform may receive a request to modify an existing service mesh application. In some embodiments, the multi-cloud service mesh orchestration platform can include a user interface (e.g., the UI 412) to enable a user to define an application profile and to deploy a service mesh application or to update an application profile and modify an existing service mesh application. For example, the administrator may interact with the user interface to deploy an enterprise application, E_APP, such as a collaboration system, an email or other communication system, an enterprise resource planning system, a customer relationship management system, a human resource management system, a financial management system, a content management system, an e-commerce system, a social network, and so forth. The request can implicitly or explicitly include governance information (e.g., TCO, SLA, provisioning, deployment, and operational criteria) for the service mesh application indicating how to provision computing resources from multiple CSP networks for deploying and operating the application. The governance information can be directly included in the request (e.g., via an REST API command) and/or indirectly included programmatically using getters and setters (e.g., via an SDK for a programming language such as C++, Go, Java®, JavaScript®, Microsoft .NET®, Node.js, PHP, Python™, Ruby, etc.). In some embodiments, the multi-cloud service mesh orchestration platform can extract concrete and quantifiable monetary constraints, QoS requirements, and other governance information regarding how to provision, deploy, and operate the application from higher-level and abstract governance information in the form of a document, a contract, and the like, and tag the application with concrete and quantifiable governance information.

From the activity 504 or the activity 506, the workflow 500 can proceed to an activity 508 in which the multi-cloud service mesh orchestration platform can partition the service mesh application to be deployed or updated per the received request into the application's constituent components (e.g., layers, services, microservices, etc.). In this example, the platform can determine the microservice containers that make up the service mesh application. For instance, the multi-cloud service mesh orchestration platform can parse the application profile for E_APP to determine that the service mesh application comprises microservice containers E_APP_MICRSVC_1, E_APP_MICRSVC_2, . . . , and E_APP_MICRSVC_N.

After the platform determines the constituent components of the service mesh platform, the workflow 500 can continue to an activity 510, an activity 512, and an activity 514 that the multi-cloud service mesh orchestration platform can perform for each microservice container to determine the various deployment and operational parameters of the individual components of the service mesh application. For example, at the activity 510, the multi-cloud service mesh orchestration platform can instantiate microservice configuration objects for each microservice container.

At the activity 512, the multi-cloud service mesh orchestration platform can tag a microservice configuration object with information associating the microservice container with the service mesh application, such as the role of the microservice container (e.g., a Directed Acyclic Graph (DAG) graph representing the service mesh application with each node representing a microservice container and each edge indicating the flow of the application), the microservice container's dependencies and other microservice containers dependent upon the microservice container, and so forth. In some cases, a microservice configuration object may be tagged with multiple labels relating to its role if a microservice container forms a part of multiple applications.

At the activity 514, the multi-cloud service mesh orchestration platform can tag the microservice configuration objects with microservice-level governance information. In some embodiments, the multi-cloud service mesh orchestration platform can include a governance mapping module (e.g., the governance mapping module 414) for mapping governance information at the highest level of the application hierarchy for the service mesh application (e.g., application-level TCO constraint, SLA, etc.) to governance information at lower levels of the application hierarchy (e.g., microservice-level cost constraints, SLA requirements, etc.). For example, if the application-level SLA requires a response to a client request to return within a specified time period (e.g., 5 seconds), the multi-cloud service mesh orchestration platform can dynamically tune and designate microservice-level SLAs to each constituent microservice container of the application to ensure the application-level SLA is satisfied. In the case of E_APP, if a particular client request invokes microservice containers E_APP_MICROSVC_1, E_APP_MICROSV_2, and E_APP_MICROSVC_3, then the multi-cloud service mesh orchestration platform may tag each of the corresponding microservice configuration objects with a microservice-level SLA to return a response within 1.67 seconds.

After the activities 510, 512, and 514, the workflow 500 can proceed to an activity 516 in which the multi-cloud service mesh orchestration platform can determine configuration information for sidecar proxies (e.g., the ingress sidecar proxies 322 and egress sidecar proxies 324) needed for injecting into pods to run alongside each microservice container. The sidecar proxies can control routing between microservice containers. Additionally, the sidecar proxies can enable the multi-cloud service mesh orchestration platform to monitor microservice-level SLAs and ensure compliance with application-level SLA.

After the platform determines the sidecar proxies needed by the service mesh application's microservice containers, the workflow 500 can proceed to an activity 524 in which the multi-cloud service mesh orchestration platform can select the CSP network and compute instances in which the microservice containers can be deployed based on the current reinforcement learning policy functions for the microservice containers. As discussed, the multi-cloud service mesh orchestration platform can include a multi-agent reinforcement learning system for determining how and where to optimally deploy the microservice containers, such as to minimize CSP costs while satisfying specified QoS levels, maximize application performance or capacity within a prescribed budget, or maintain specified levels of load distribution to protect against vendor lock-in, ensure compatibility across multiple CSPs, increase reliability, decrease effectiveness of Distributed Denial of Service (DDoS) attacks, and so forth. When an application is initially deployed, the reinforcement learning system's agents may not have sufficient information to make an intelligent decision regarding how and where to provision compute instances for deploying the microservice containers. Under these circumstances, each learning agent may randomly select an action to perform for provisioning the compute instances in which the microservice containers may be deployed. In other situations, the multi-cloud service mesh orchestration platform can invoke a billing and cost management API of the CSP networks (e.g., AWS® Billing and Cost Management, Google Cloud™ Billing, Microsoft Azure® Billing and Cost Management, etc.) and/or logging or monitoring APIs of the CSPs (e.g., AWS CloudTrail®, Google Compute Engine™ Activity Logs, Microsoft Azure® Monitor, etc.) to select from among the participating CSP networks for provisioning the compute instances to deploy the microservice containers.

After one or more CSP networks are selected for provisioning the computing resources to deploy the microservice containers, the workflow 500 can proceed to an activity 526 in which the multi-cloud service mesh orchestration platform can specify the parameters of the sidecar proxy configuration objects to interconnect the microservice containers. Unlike traditional sidecar proxies, which may route the microservice containers based only on network performance, the multi-cloud service mesh orchestration platform may alternatively or additionally configure the sidecar proxies to route the microservice containers according to their governance modes.

Upon the multi-cloud service mesh orchestration platform configuring sidecar proxy routing, the workflow 500 can proceed to a decision block 528 in which the multi-cloud service mesh orchestration platform can determine whether new compute instances must be provisioned to deploy the microservice containers. If new computing resources do not need to be provisioned, the workflow 500 can proceed to a decision block 530. If new compute instances must be provisioned, the workflow 500 can proceed to an activity 532. At the decision block 530, the multi-cloud service mesh orchestration platform can determine whether to migrate existing microservice containers from a current CSP network to a new CSP network selected at activity 524. If the multi-cloud service mesh orchestration platform determines not to migrate the existing microservice containers, the workflow 500 can proceed to activities 518, 520, and 522 to poll and fetch or otherwise receive request metrics, unreserved resource metrics, SLA metrics, and resource utilization metrics, among other metrics.

At the activity 532, the multi-cloud service mesh orchestration platform can select the CSP-specific resources for deploying the microservice containers and the sidecar proxies for interconnecting the microservices. This can include determining whether to deploy the microservice containers and sidecar proxies using unreserved computing resources or reserved computing resources. This can also include determining the characteristics of the virtual machines and/or containers to provision, such as the type of CPU, number of CPU cores, CPU processing rate, type of GPU, number of GPU cores, GPU processing rate, amount of memory, type of storage, amount of storage, storage bandwidth, type of hypervisor or other virtualization management software, and so forth.

From the activity 532, the workflow 500 can proceed to a decision block 536 in which the multi-cloud service mesh orchestration platform can determine whether the control elements for the container orchestrator and the service mesh are available in the one or more CSP networks selected at the activity 524. The decision block 536 can operate as a safety mechanism to prevent a race condition from occurring in the event the multi-cloud service mesh orchestration platform has not yet completed deploying the control elements for the container orchestrator and the service mesh in the selected CSP networks. For example, if the container orchestrator and the service mesh are not accessible within the selected CSP networks, then the workflow 500 can wait until completion of the activity 534. If the container orchestrator and the service mesh are accessible within the selected CSP networks, then the workflow 500 can proceed to an activity 538.

At the activity 538, the multi-cloud service mesh orchestration platform can deploy the microservice containers in the selected CSP networks. In some embodiments, the multi-cloud service mesh orchestration platform can include a provisioning module (e.g., the provisioning module 426) for invoking the CSP-specific unreserved compute instance provisioning APIs (e.g., EC2® Spot Instances, Google Cloud® Pre-emptible VM Instances, Azure® Low-priority VMs, etc.) and/or other CSP-specific provisioning APIs (e.g., EC2®, Lightsail®, Amazon® Elastic Container Service, AWS Fargate®, Google Compute Engine™, Google® Kubernetes Engine, Azure® Virtual Machines, Azure® Virtual Machine Scale Sets, Azure® Kubernetes Service, Azure® Container Instances, etc.) for provisioning the CSP-specific resources for deploying the microservice containers and sidecar proxies.

After deployment of the microservice containers, the workflow 500 can continue to activities 518, 520, and 522 in which the multi-cloud service mesh orchestration platform can collect request metrics, resource metrics, governance metrics, and/or other metrics, and evaluate these metrics to determine whether to provision additional compute instances and how and where to provision them, whether to migrate existing microservice containers, and/or whether to hibernate or terminate existing microservice containers. For example, at the activity 518, the multi-cloud service mesh orchestration platform can continuously poll and fetch or otherwise receive request metrics for the microservice containers. In some embodiments, the multi-cloud service mesh orchestration platform can include a request metering module (e.g., the request metering module 416) for obtaining the request metrics. In some embodiments, the request metering module can invoke the logging or monitoring APIs of the CSPs (e.g., AWS CloudTrail®, Google Compute Engine™ Activity Logs, Microsoft Azure® Monitor, etc.) to obtain the request metrics. Alternatively or in addition, the request metering module can interface with a policy and telemetry hub (e.g., the policy and telemetry hub 310), which can in turn communicate with ingress sidecar proxies (e.g., the ingress sidecar proxies 322) and egress sidecar proxies (e.g., the egress sidecar proxies 324) to obtain the request metrics. The request metering module can collect the request metrics for the entire application per client request, as well as for each microservice container per client request.

At the activity 520, the multi-cloud service mesh orchestration platform can continuously poll and fetch or otherwise receive resource utilization and governance metrics for the microservice containers. In some embodiments, the multi-cloud service mesh orchestration platform can include a resource metering module (e.g., the resource metering module 418) for obtaining the resource utilization metrics. In some embodiments, the resource metering module can invoke the logging or monitoring APIs of the CSPs (e.g., AWS CloudTrail®, Google Compute Engine™ Activity Logs, Microsoft Azure® Monitor, etc.) to obtain the resource utilization metrics. Alternatively or in addition, the request metering module and the resource utilization metering module can interface with the control plane 402 and/or the container orchestrator (e.g., the master 202) in each participating cloud, which can in turn communicate with the physical hosts or virtual machines on which the microservice containers run. The resource metering module can collect the resource utilization metrics that actually get consumed as part of running a client query. This information can provide resource utilization metrics for each microservice container per client request, which can be aggregated to obtain the resource utilization metrics for the entire application per client request.

In addition, the multi-cloud service mesh orchestration platform can continuously poll and fetch or otherwise receive governance metrics for the microservice containers. In some embodiments, the multi-cloud service mesh orchestration platform can include a governance metering module (e.g., the governance metering module 420) for monitoring and receiving metrics relevant to governing the service mesh application at the broadest levels of applicability (e.g., TCO constraints, application-level SLAs, etc.) to the most specific level levels of applicability (e.g., microservice-level cost constraints, microservice-level SLAs, etc.). In some embodiments, the governance metering module can invoke the logging or monitoring APIs of the CSPs (e.g., AWS CloudTrail®, Google Compute Engine™ Activity Logs, Microsoft Azure® Monitor, etc.) to obtain the SLA metrics. Alternatively or in addition, the SLA metering module can interface with the policy and telemetry hub and/or the ingress sidecar proxies and egress sidecar proxies to obtain the SLA metrics.

At the activity 522, the multi-cloud service mesh orchestration platform can continuously poll and fetch or otherwise receive metering information for unreserved compute instances from each of the participating CSP networks. The metrics for the unreserved compute instances can indicate periods of time when the CSP networks may have unreserved and unused compute instances available for provisioning and offer the unreserved compute instances at lower costs. In some embodiments, the multi-cloud service mesh orchestration platform can include an unreserved metering module (e.g., the unreserved metering module 422) for tracking these periods of time. The unreserved module can invoke the unreserved compute instance provisioning APIs of the CSP networks (e.g., EC2® Spot Instances, Google Cloud® Pre-emptible VM Instances, Microsoft Azure® Low-priority VMs, etc.) to obtain these metrics.

From the activities 518, 520, and 522, the workflow 500 may proceed to the activity 524 to evaluate the request metrics, resource utilization metrics, governance metrics, and metrics regarding unreserved compute instances, and other metrics resource utilization metrics to determine whether to provision new compute instances and how and where to provision them, migrate existing microservice containers and where to migrate them, and/or hibernate or terminate currently provisioned compute instances for existing microservices. Table 2 sets forth an example of pseudo-code for implementing the activity 524.

TABLE 2

Example of Pseudo Code for Selecting CSP Networks

```
1.  request_map = get_request_metrics_from_sidecar( )
2.  resource_map = get_resource_utilization_metrics_from_container_orchestrator( )
3.  sla = get_sla_requirements( )
4.  mode = get_governance_mode( )
5.  for each csp:
6.    if csp_has_spare_capacity:
7.      kpi_map[i] = eval_deployment_using_spare_capacity_resources( )
8.    else:
9.      kpi_map[i] = eval_deployment_using_reserved_resources( )
10. selected_csp = current_csp
11. selected_resources = current_resources
12. if mode == optimize_on_cost:
13.   lowest_cost_csp, lowest_cost_resources = identify_lowest_cost_csp_and_resources( )
14.   if satisfies_sla_requirements(lowest_cost_csp, lowest_cost_resources)
15.     selected_csp, selected_resources = lowest_cos_csp, lowest_cost_resources
16. elif mode == optimize_on_capacity
17.   highest_cap_csp, highest_cap_resources = identify_highest_cap_csp_and_resources( )
18.   if satisfies sla_requirements(highest_cap_csp, highest_cap_resources)
19.     selected_csp, selected_resources = highest_cap_csp, highest_cap_resources
20. return selected_csp, selected_resources
```

Figure 6:
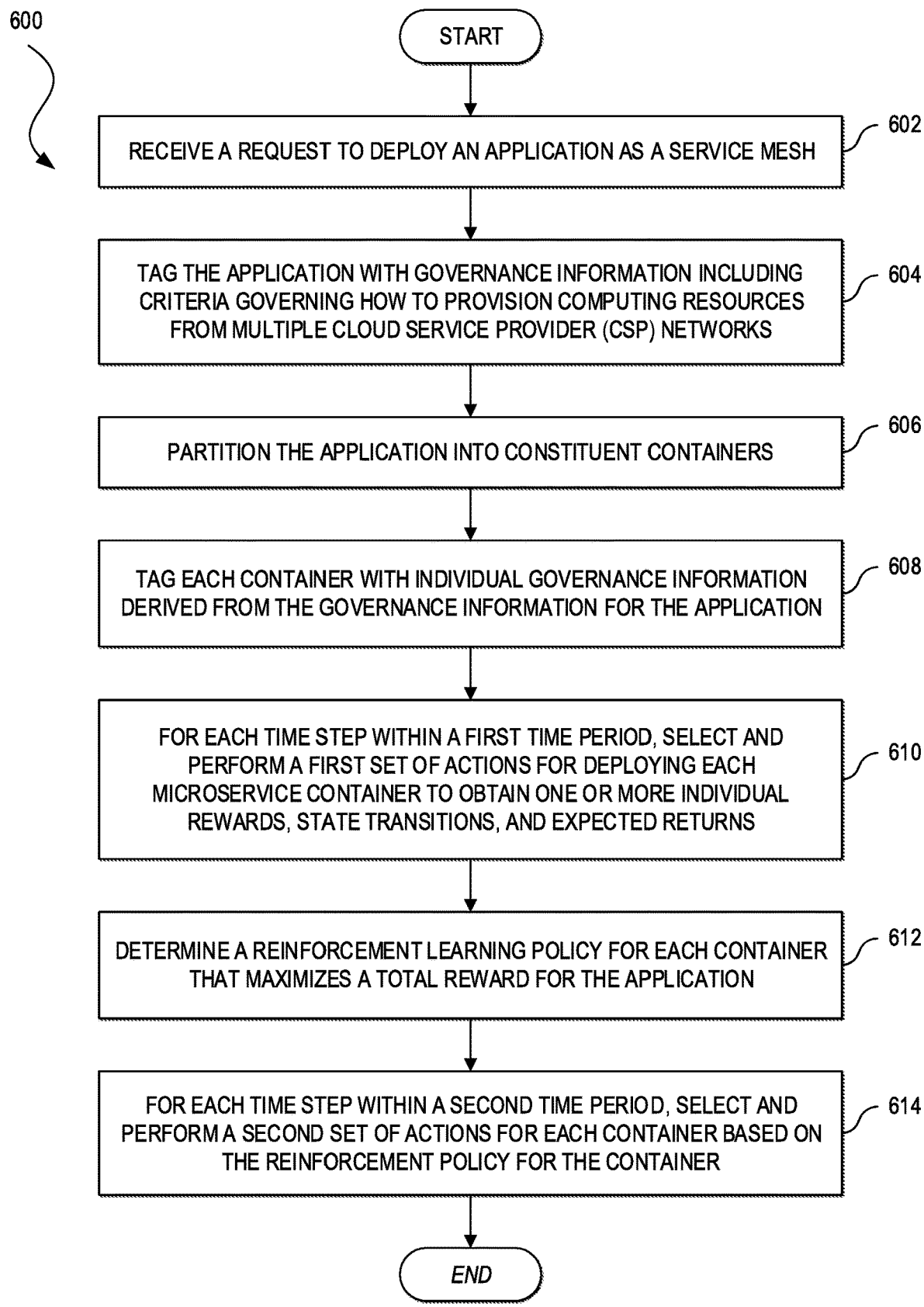
FIG. 6 illustrates a flow diagram of an example of a process for orchestrating microservice containers of a service mesh application in a multi-cloud environment in accordance with an embodiment.

FIG. 6 illustrates a flow diagram of an example of a process 600 for orchestrating microservice containers of a service mesh application in a multi-cloud environment. The process 600 can be performed by one or more processors of a computing system (e.g., the multi-cloud service mesh orchestration platform 400) including memory and having instructions that, when executed by the one or more processors, cause the computing system to the steps of the process 600.

The process 600 may begin with step 602 in which the multi-cloud service mesh orchestration platform can receive a request to deploy an application as a service mesh application. The platform can instantiate the service mesh application in response to the request, and at step 604, tag the service mesh application with governance information including criteria governing how to provision computing resources from multiple CSP networks for deploying and operating the service mesh application. For example, the governance information can include criteria to minimize TCO while complying with predetermined SLA requirements, criteria to maximize one or more performance metrics or a capacity of the service mesh application within a predetermined TCO budget, and criteria to maximize application performance while remaining within predetermined load levels across the multiple CSPs, among others. In some embodiments, the multi-cloud service mesh orchestration platform can include a user interface (e.g., the UI 412) to enable an administrator to define an application profile and to deploy a corresponding application or to update an application profile and modify an existing application corresponding to the updated application profile. The UI may also allow the administrator to define TCO constraints, an SLA, and other governance information for the application that sets forth the application's provisioning, deployment, and operational requirements, as well as outline the relationship deployment environments, applications, application components, and so forth. The application profile can be encoded using XML, JSON, YAML, or other suitable format, and can include a description of the topology of the application and its dependencies, infrastructure resource and cloud-service requirements, a descriptions of deployment artifacts (e.g., packages, binaries, scripts, data, etc.), orchestration procedures needed to deploy, configure, and secure the application, run-time policies that guide ongoing lifecycle management, upgrade information, backup-and-restore information, and so forth.

At step 606, the multi-cloud service mesh orchestration platform can partition the service mesh application into its constituent components (e.g., layers, services, microservices, etc.). For example, the platform can partition the application into microservice containers, but other approaches may also be used depending on the application hierarchy. At step 608, the multi-cloud service mesh orchestration platform can tag each component with individual component-level governance information derived from the governance information for the service mesh application. In some embodiments, the multi-cloud service mesh orchestration platform can evaluate an application profile to create microservice configuration objects corresponding to the microservice containers making up the application. The multi-cloud service mesh orchestration platform can tag each microservice configuration object with information regarding the microservice's role in the application (e.g., the microservice's dependencies and the microservices dependent on the microservice), individual monetary cost constraints, individual; SLA requirements, and other individual criteria governing how to provision the underlying computing resources for the microservice container and how to deploy and operate the microservice container.

Before the initial deployment of the microservice containers, the multi-cloud service mesh orchestration platform may not have sufficient information to make an intelligent decision regarding where to provision computing resources and deploy the microservice containers. Under these circumstances, the multi-cloud service mesh orchestration platform can include a reinforcement learning system to learn the optimal deployment for the application. The reinforcement learning system can begin by selecting one or more default CSP networks and reserving compute instances for initially deploying the microservice containers. In other situations, the multi-cloud service mesh orchestration platform can invoke a billing and cost management API of the CSP networks (e.g., AWS® Billing and Cost Management, Google Cloud™ Billing, Microsoft Azure® Billing and Cost Management, etc.) and/or logging or monitoring APIs of the CSPs (e.g., AWS CloudTrail®, Google Compute Engine™ Activity Logs, Microsoft Azure® Monitor, etc.) to select from among the participating CSP networks to provision the compute instances for initial deployment the microservice containers.

Thereafter, the multi-cloud service mesh orchestration platform can employ reinforcement learning to determine the optimal deployment for the service mesh application. For example, the platform may utilize Q-learning to iteratively update Q-values for each state-action pair (e.g., taking an action, receiving a reward and state transition, updating Q-values with the reward and largest expected return, and repeating until transitioning to an end state) for each time step over a time period until convergence with the optimal Q-value function. Q-learning can be used to determine an optimal Q-value function (e.g., a function that assigns to each state-action pair the largest expected return, or total amount of reward accumulated over the future, for a given state and a given action), and an optimal policy (e.g., the policy that maximizes a total reward (or minimize a total cost) over a time period. The optimal policy can be derived by applying the greedy policy to the optimal Q-value function.

For example, at step 610, for each time step within a first time period, the multi-cloud service mesh orchestration platform can select and perform a first set of actions from multiple sets of actions for deploying each microservice container of the service mesh application to obtain one or more individual rewards, state transitions, and expected returns until transitioning at an end state. This process can be repeated iteratively for the first time period until the platform determines the optimal Q-value function. At step 612, the platform can derive the optimal policy by applying the greedy policy to the optimal Q-value function. As discussed, the reinforcement learning policy for each microservice container can maximize a total reward for the service mesh application based on the one or more individual rewards, state transitions, and expected returns of each first set of actions selected performed for each microservice container for each time step within the first time period.

The process 600 can conclude at step 614 in which the multi-cloud service mesh orchestrator platform can select and perform a second set of actions for each microservice container based on the reinforcement learning policy for the microservice container for each time step within a second time period. In some embodiments, the multi-cloud service mesh orchestration platform can continuously re-learn the optimal deployment for the service mesh application to dynamically adapt to different network conditions, loads, TCOs, and other characteristics of the application. The multi-cloud service mesh orchestration platform can obtain one or more second individual rewards, state transitions, and expected returns of each second set of actions selected and performed for each microservice container for each time step within the second time period. The multi-cloud service mesh orchestration platform can determine an updated reinforcement learning policy that maximizes the total reward for the service mesh application based on the one or more second individual rewards, state transitions, and expected returns of each second set of actions selected and performed for each microservice container for each time step within the second time period. For each time step within a third time period, the platform can select and perform a third set of actions for each microservice container of the service mesh application based on the updated reinforcement learning policy for the microservice container.

Figure 7A:
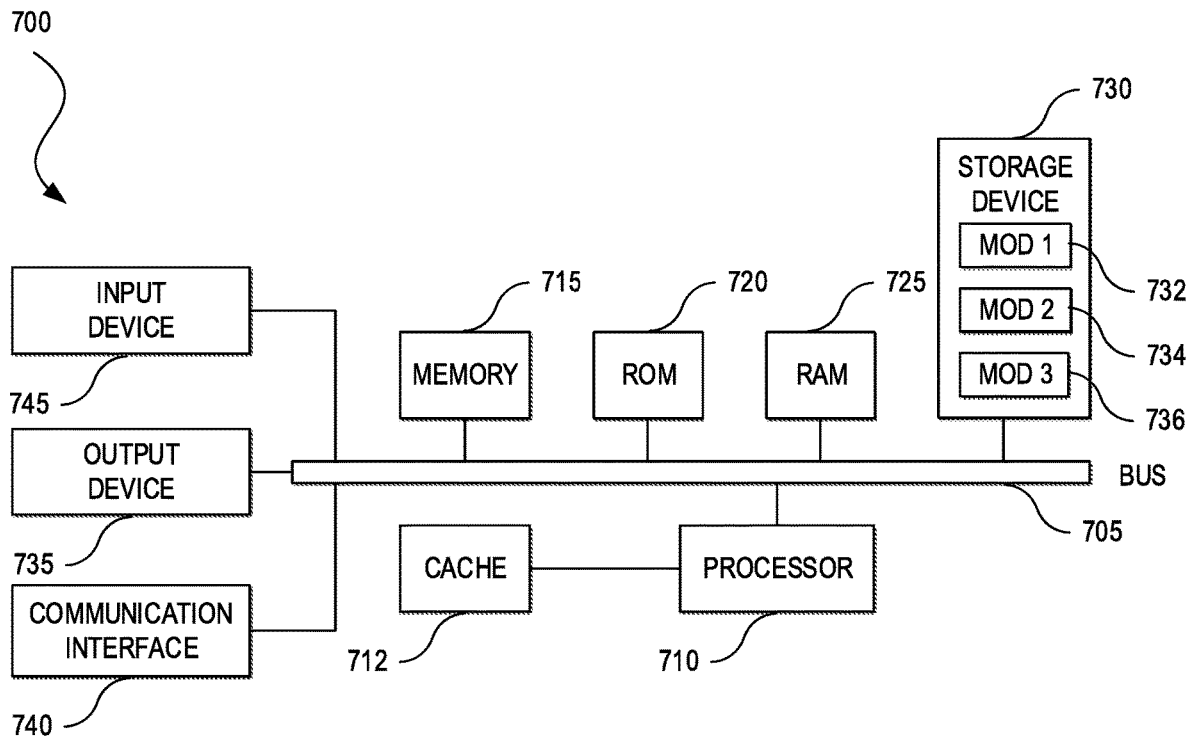
FIGS. 7A and 7B illustrate block diagrams of examples of computing systems in accordance with some embodiments.
Figure 7B:
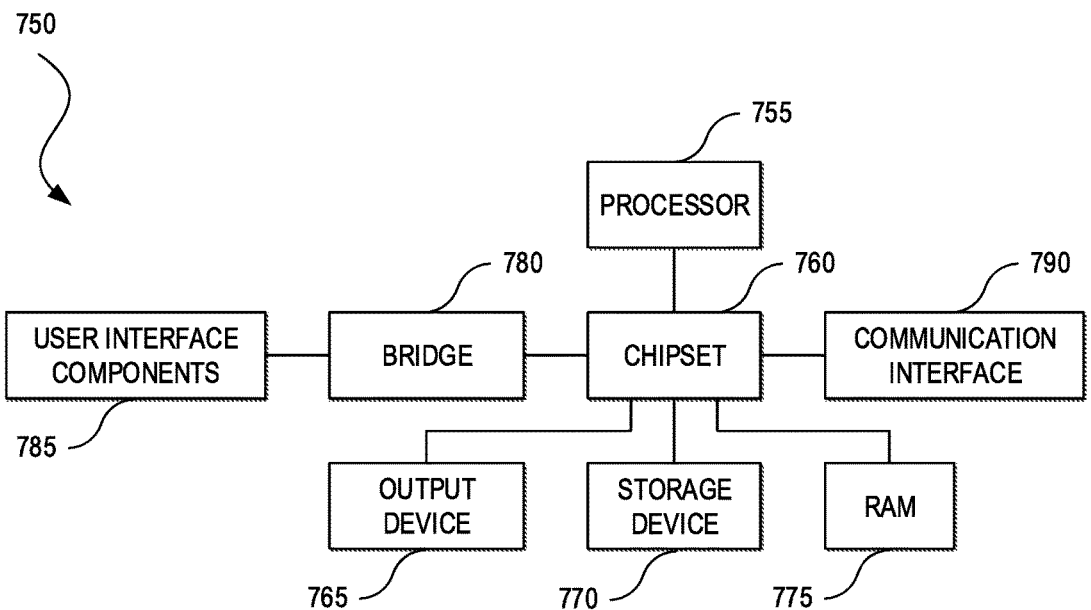

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method performed by a multi-cloud service mesh orchestration platform, the method comprising:
   receiving a request to deploy an application as a service mesh application;
   instantiating the service mesh application in response to the request;
   tagging the service mesh application with governance information including criteria governing how to provision computing resources from multiple Cloud Service Provider (CSP) networks for deploying and operating the service mesh application;
   partitioning the service mesh application into constituent microservice containers, wherein each respective microservice container includes a computing environment;
   tagging each microservice container with individual governance information derived from the governance information for the service mesh application;
   determining configuration information for sidecar proxies, wherein the sidecar proxies control routing between the constituent microservice containers based at least in part on the respective individual governance information of the respective microservice container;
   for each time step within a first time period, selecting and performing a first set of actions for deploying each microservice container using a reserved computing instance of a first CSP network of the multiple CSP networks to obtain one or more individual rewards, state transitions, and expected returns, wherein at the first time period the reserved computing instance meets one or more criteria of the governance information better than an unreserved computing instance;
   determining a reinforcement learning policy for each microservice container that maximizes a total reward for the service mesh application based on the one or more individual rewards, state transitions, and expected returns of each first set of actions selected and performed for each microservice container for each time step within the first time period; and
   for each time step within a second time period, selecting and performing a second set of actions for each microservice container based on the reinforcement learning policy for the microservice container that maximize the total reward, wherein at least one of the second set of actions migrates a microservice container of the constituent microservice containers to the unreserved computing instance of a second CSP network of the multiple CSP networks when the unreserved computing instance meets the one or more criteria of the governance information better than the reserved computing instance.

2. The computer-implemented method of claim 1, further comprising:
   obtaining one or more second individual rewards, state transitions, and expected returns of each second set of actions selected and performed for each microservice container for each time step within the second time period;
   determining an updated reinforcement learning policy that maximizes the total reward for the service mesh application based on the one or more second individual rewards, state transitions, and expected returns of each second set of actions selected and performed for each microservice container for each time step within the second time period; and
   for each time step within a third time period, selecting and performing a third set of actions for each microservice container based on the updated reinforcement learning policy for the microservice container.

3. The computer-implemented method of claim 1, wherein the second set of actions includes terminating or hibernating the reserved compute instance when the second set of actions includes migrating the microservice container using the unreserved compute instance.

4. The computer-implemented method of claim 1, wherein the reserved compute instance and the unreserved compute instance are located within a same CSP network.

5. The computer-implemented method of claim 1, further comprising:
deploying a first microservice container of the service mesh application using a first compute instance provisioned from the first CSP network and a second microservice container of the service mesh application using a second compute instance provisioned from the second CSP network.

6. The computer-implemented method of claim 1, further comprising:
deploying a first instance of a first microservice container of the service mesh application using a first compute instance provisioned from the first CSP network and a second instance of the first microservice container using a second compute instance provisioned from the second CSP network.

7. The computer-implemented method of claim 1, wherein the governance information includes criteria to minimize a Total Cost of Ownership (TCO) for the service mesh application.

8. The computer-implemented method of claim 1, wherein the governance information includes criteria to maximize one or more performance metrics or a capacity of the service mesh application.

9. The computer-implemented method of claim 1, wherein the governance information includes criteria to maintain specified load levels across the multiple CSP networks.

10. A multi-cloud service mesh orchestration platform system, comprising:
one or more processors; and
memory including instructions that, when executed by the one or more processors, cause the multi-cloud service mesh orchestration platform system to:
receive a request to deploy an application as a service mesh application;
instantiate the service mesh application in response to the request;
tag the service mesh application with governance information including criteria governing how to provision computing resources from multiple Cloud Service Provider (CSP) networks for deploying and operating the service mesh application;
partition the service mesh application into constituent microservice containers wherein each respective microservice container includes a computing environment; tag each microservice container with individual governance information derived from the governance information for the service mesh application;
determining configuration information for sidecar proxies, wherein the sidecar proxies control routing between the constituent microservice containers based at least in part on the respective individual governance information of the respective microservice container;
for each time step within a first time period, select and perform a first set of actions for deploying each microservice container using a reserved computing instance of a first CSP network of the multiple CSP networks to obtain one or more individual rewards, state transitions, and expected returns, wherein at the first time period the reserved computing instance meets one or more criteria of the governance information better than an unreserved computing instance;
determine a reinforcement learning policy for each microservice container that maximizes a total reward for the service mesh application based on the one or more individual rewards, state transitions, and expected returns of each first set of actions selected and performed for each microservice container for each time step within the first time period; and
for each time step within a second time period, select and perform a second set of actions for each microservice container based on the reinforcement learning policy for the microservice container that maximize the total reward, wherein at least one of the second set of actions migrates a microservice container of the constituent microservice containers to the unreserved computing instance of a second CSP network of the multiple CSP networks when the unreserved computing instance meets the one or more criteria of the governance information better than the reserved computing instance.

11. The multi-cloud service mesh orchestration platform system of claim 10, further comprising further instructions that, when executed by the one or more processors, further cause the system to:
obtain one or more second individual rewards, state transitions, and expected returns of each second set of actions selected and performed for each microservice container for each time step within the second time period;
determine an updated reinforcement learning policy that maximizes the total reward for the service mesh application based on the one or more second individual rewards, state transitions, and expected returns of each second set of actions selected and performed for each microservice container for each time step within the second time period; and
for each time step within a third time period, select and perform a third set of actions for each microservice container based on the updated reinforcement learning policy for the microservice container.

12. The multi-cloud service mesh orchestration platform system of claim 11, further comprising further instructions that, when executed by the one or more processors, further cause the system to:
terminate or hibernate the reserved compute instance when the second set of actions includes migrating the microservice container using the unreserved compute instance.

13. The multi-cloud service mesh orchestration platform system of claim 10, wherein the reserved compute instance and the unreserved compute instance are located within a same CSP network.

14. A non-transitory computer-readable storage medium including instructions that, upon being executed by one or more processors of a multi-cloud service mesh orchestration platform system, cause the multi-cloud service mesh orchestration platform system to:
receive a request to deploy an application as a service mesh application;
instantiate the service mesh application in response to the request;
tag the service mesh application with governance information including criteria governing how to provision computing resources from multiple Cloud Service Provider (CSP) networks for the service mesh application;
partition the service mesh application into constituent microservice containers wherein each respective microservice container includes a computing environment;
tag each microservice container with individual governance information derived from the governance information for the service mesh application;

determining configuration information for sidecar proxies, wherein the sidecar proxies control routing between the constituent microservice containers based at least in part on the respective individual governance information of the respective microservice container;

for each time step within a first time period, select and perform a first set of action for deploying each microservice container using a reserved computing instance of a first CSP network of the multiple CSP networks to obtain one or more individual rewards, state transitions, and expected returns, wherein at the first time period the reserved computing instance meets one or more criteria of the governance information better than an unreserved computing instance;

determine a reinforcement learning policy for each microservice container that maximizes a total reward for the service mesh application based on the one or more individual rewards, state transitions, and expected returns of each first set of actions selected and performed for each microservice container for each time step within the first time period; and for each time step within a second time period, select and perform a second set of actions for each microservice container based on the reinforcement learning policy for the microservice container that maximize the total reward, wherein at least one of the second set of actions migrates a microservice container of the constituent microservice containers to the unreserved computing instance of a second CSP network of the multiple CSP networks when the unreserved computing instance meets the one or more criteria of the governance information better than the reserved computing instance.

15. The non-transitory computer-readable storage medium of claim 14, further comprising further instructions that, when executed by the one or more processors, further cause the multi-cloud service mesh orchestration platform system to:

deploy a first microservice container of the service mesh application using a first compute instance provisioned from the first CSP network and a second microservice container of the service mesh application using a second compute instance provisioned from the second CSP network.

16. The non-transitory computer-readable storage medium of claim 14, further comprising further instructions that, when executed by the one or more processors, further cause the multi-cloud service mesh orchestration platform system to:

deploy a first instance of a first microservice container of the service mesh application using a first compute instance provisioned from the first CSP network and a second instance of the first microservice container using a second compute instance provisioned from the second CSP network.

17. The non-transitory computer-readable storage medium of claim 14, wherein the governance information includes criteria to minimize a Total Cost of Ownership (TCO) for the service mesh application.

18. The non-transitory computer-readable storage medium of claim 14, wherein the governance information includes criteria to maximize one or more performance metrics or a capacity of the service mesh application.

* * * * *